United States Patent
Hu et al.

(10) Patent No.: US 12,336,002 B2
(45) Date of Patent: Jun. 17, 2025

(54) SYSTEMS, METHODS, AND APPARATUS FOR SLOT STRUCTURE, CHANNEL ACCESS, AND RESOURCE ALLOCATION FOR SIDELINK COMMUNICATIONS

(71) Applicant: Samsung Electronics Co., Ltd., Suwon-si (KR)

(72) Inventors: Liang Hu, San Diego, CA (US); Philippe Jean Marc Michel Sartori, Naperville, IL (US); Yaser Mohamed Mostafa Kamal Fouad, San Diego, CA (US); Jung Hyun Bae, San Diego, CA (US)

(73) Assignee: SAMSUNG ELECTRONICS CO., LTD. (KR)

( * ) Notice: Subject to any disclaimer, the term of this patent is extended or adjusted under 35 U.S.C. 154(b) by 318 days.

(21) Appl. No.: 17/886,449

(22) Filed: Aug. 11, 2022

(65) Prior Publication Data
US 2023/0087110 A1    Mar. 23, 2023

Related U.S. Application Data

(60) Provisional application No. 63/243,089, filed on Sep. 10, 2021, provisional application No. 63/336,236, filed on Apr. 28, 2022.

(51) Int. Cl.
*H04W 74/08* (2024.01)
*H04W 28/26* (2009.01)
(Continued)

(52) U.S. Cl.
CPC ....... *H04W 74/0808* (2013.01); *H04W 28/26* (2013.01); *H04W 48/18* (2013.01); *H04W 72/20* (2023.01)

(58) Field of Classification Search
CPC . H04W 74/0808; H04W 72/20; H04W 28/26; H04W 48/18
(Continued)

(56) References Cited

U.S. PATENT DOCUMENTS 10,667,288 B2   5/2020   Chendamarai Kannan et al.
11,044,135 B2   6/2021   Bhattad et al.
(Continued)

FOREIGN PATENT DOCUMENTS

WO    WO-2017099860 A1 *   6/2017

OTHER PUBLICATIONS

Garcia, Mario H. Castañeda, et al., "A Tutorial on 5G NR V2X Communications," IEEE Communications Surveys & Tutorials, vol. 23, No. 3, Feb. 2021, 55 pages.
(Continued)

*Primary Examiner* — Gbemileke J Onamuti
(74) *Attorney, Agent, or Firm* — Renaissance IP Law Group LLP

(57) ABSTRACT

A device may perform a transmission that may occupy at least a portion of a first slot and perform a listen-before-talk (LBT) sensing operation, wherein the LBT sensing operation may occupy at least a portion of an LBT gap, and at least a portion of the LBT gap may occupy at least a portion of a second slot. A device may perform a transmission that may occupy at least a portion of a first slot, transmit an indication of a resource for an LBT sensing operation, perform an LBT sensing operation for the transmission that may occupy at least a portion of a second slot, and transmit, based on the LBT sensing operation, a reservation signal that may occupy at least a portion of the second slot. A device select a resource for a transmission using a sidelink channel, and select a resource for an LBT sensing operation.

20 Claims, 12 Drawing Sheets

(51) Int. Cl.
    *H04W 48/18*     (2009.01)
    *H04W 72/20*     (2023.01)
    *H04W 74/0808*     (2024.01)

(58) Field of Classification Search
    USPC .......................................................... 370/329
    See application file for complete search history.

(56) References Cited

U.S. PATENT DOCUMENTS

| | | |
|---|---|---|
| 11,184,924 B2 | 11/2021 | Yang et al. |
| 11,265,917 B2 | 3/2022 | Zhang et al. |
| 2022/0061095 A1 | 2/2022 | Xue et al. |
| 2022/0070921 A1 | 3/2022 | Xue et al. |
| 2023/0095560 A1* | 3/2023 | Stefanatos ........ H04W 74/0808 370/329 |
| 2023/0224959 A1* | 7/2023 | Wu ................... H04W 74/0808 370/329 |

OTHER PUBLICATIONS

Intel Corporation, "Sidelink Resource Allocation Design for NR V2X Communication," 3GPP TSG RAN WG1 Meeting #96bis, R1-1904296, Xi'an, China, Apr. 8-12, 2019, 15 pages.

Zajac, Marek, et al., "Resolving 5G NR-U Contention for Gap-Based Channel Access in Shared Sub-7 GHz Bands," IEEE Access, vol. 10, Jan. 2022, pp. 4031-4047.

* cited by examiner

SYSTEMS, METHODS, AND APPARATUS FOR SLOT STRUCTURE, CHANNEL ACCESS, AND RESOURCE ALLOCATION FOR SIDELINK COMMUNICATIONS

CROSS-REFERENCE TO RELATED APPLICATIONS

This application claims priority to, and the benefit of, U.S. Provisional Patent Application Ser. No. 63/243,089 filed Sep. 10, 2021 and U.S. Provisional Patent Application Ser. No. 63/336,236 filed Apr. 28, 2022, both of which are incorporated by reference.

TECHNICAL FIELD

This disclosure relates generally to communication systems, and specifically to systems, methods, and apparatus for slot structure, channel access, and resource allocation for sidelink communications.

BACKGROUND

A wireless communication system may implement a listen-before-transmit (LBT) procedure in which an apparatus that intends to transmit on a communication channel may first listen for transmissions from other apparatus to avoid collisions on the channel. An LBT procedure may be used, for example, in unlicensed spectrum where there may be no centralized control of transmissions from different systems.

The above information disclosed in this Background section is only for enhancement of understanding of the background of the invention and therefore it may contain information that does not constitute prior art.

SUMMARY

A device may include a transceiver configured to access a communication network using a sidelink channel, and a device controller configured to perform a transmission using the sidelink channel, wherein the transmission may occupy at least a portion of a first slot, transmit, using the sidelink channel, an indication of a resource for a listen-before-transmit (LBT) sensing operation for the transmission, perform, using the resource, the LBT sensing operation, wherein the LBT sensing operation may occupy at least a portion of a second slot, wherein the LBT sensing operation may occupy at least a portion of an LBT gap, and at least a portion of the LBT gap may occupy at least a portion of a second slot. The indication may include sidelink control information. The LBT gap may occupy one or more symbols of the second slot. The LBT gap may occupy all of the symbols of the second slot. The second slot may include a sidelink control channel portion, and the device controller may be configured to perform a decoding operation on at least a portion of the sidelink control channel portion. At least a portion of the decoding operation may overlap at least a portion of the LBT sensing operation. The sidelink control channel portion may include a physical sidelink control channel (PSCCH) symbol. The portion of the sidelink control channel portion may include sidelink control information (SCI). The second slot may be adjacent to the first slot. The LBT gap may occupy at least a portion of a third slot.

A device may include a transceiver configured to access a communication network using a sidelink channel, and a device controller configured to perform a transmission using the sidelink channel, wherein the transmission may occupy at least a portion of a first slot, perform a listen-before-transmit (LBT) sensing operation for the transmission, wherein the LBT sensing operation may occupy at least a portion of a second slot, and transmit, based on the LBT sensing operation, a reservation signal, wherein the reservation signal may occupy at least a portion of the second slot. The reservation signal may occupy a portion of the second slot between a completion of the LBT sensing operation and a guard period of the second slot. The completion of the LBT sensing operation may be based on an expiration of a backoff time. The expiration of the backoff time may be based on a backoff counter. The reservation signal may include a reference signal. The reservation signal may include at least a portion of the transmission. The portion of the transmission may include shared channel information. The portion of the transmission may include control channel information. The device controller may be configured to perform a resource reselection operation based on the LBT sensing operation. The device controller may be configured to perform the resource reselection operation based on at least a portion of the LBT sensing operation occupying at least a portion of the first slot.

A device may include a transceiver configured to access a communication network using a sidelink channel, and a device controller configured to select a resource for a transmission using the sidelink channel, and select a resource for a listen-before-transmit (LBT) sensing operation for the transmission. The resource for the transmission may include a first frequency range, and the resource for the LBT sensing operation may include a second frequency range, wherein the second frequency range may overlap, at least partially, the first frequency range. The transmission may occupy at least a portion of a first slot, and the LBT sensing operation may occupy at least a portion of a second slot. The second slot may be adjacent to the first slot. The device controller may be configured to determine a selection window for the resource for the transmission, select the resource for the transmission from the selection window, and select the resource for the LBT sensing operation from the selection window. The resource for the LBT sensing operation may be based on an LBT gap for the LBT sensing operation. The device controller may be configured to determine the LBT gap based on sidelink control information (SCI). The device controller may be configured to determine the LBT gap based on a shared channel occupancy time (COT). The device controller may be configured to select the resource for the transmission based on a priority of the transmission. The device controller may be configured to select the resource for the transmission based on a physical sidelink control channel (PSCCH) decoding operation. The device controller may be configured to select the resource for the transmission using a processing operation, and select the resource for the LBT sensing operation using the processing operation. The device controller may be configured to determine a selection window for the resource for the transmission, select the resource for the transmission from the selection window, select the resource for the LBT sensing operation from the selection window, and select the resource for the transmission based on a sensing window, and the processing operation may occupy at least a portion of a slot between the sensing window and the selection window.

A method may include performing, by a UE, a resource selection operation for a sidelink channel, wherein the resource selection operation may include selecting a resource for a transmission using the sidelink channel, and selecting a resource for a listen-before-transmit (LBT) sensing operation for the transmission. The resource for the transmission may include a first frequency range, and the resource for the LBT sensing operation may include a second frequency range, wherein the second frequency range may overlap, at least partially, the first frequency range. The transmission may occupy at least a portion of a first slot, and the LBT sensing operation may occupy at least a portion of a second slot, wherein the second slot may be adjacent to the first slot. The method may further include determining a selection window for the resource for the transmission, wherein selecting the resource for the transmission may include selecting the resource for the transmission from the selection window, and selecting the resource for the LBT sensing operation may include selecting the resource for the LBT sensing operation from the selection window. The resource for the LBT sensing operation may be based on an LBT gap for the LBT sensing operation. The method may further include determining the LBT gap based on sidelink control information (SCI). The method may further include determining the LBT gap based on a shared channel occupancy time (COT). The resource for the transmission may include selecting the resource for the transmission based on a priority of the transmission. Selecting the resource for the transmission may include selecting the resource for the transmission based on a physical sidelink control channel (PSCCH) decoding operation. Selecting the resource for the transmission may include selecting the resource for the transmission based on a sensing window, and the resource selection operation may occupy at least a portion of a slot between the sensing window and the selection window. The resource selection operation may be a first resource selection operation, and the method may further include performing the LBT sensing operation, and performing, based on the LBT sensing operation, a second resource selection operation.

BRIEF DESCRIPTION OF THE DRAWINGS

The figures are not necessarily drawn to scale and elements of similar structures or functions are generally represented by like reference numerals or portions thereof for illustrative purposes throughout the figures. The figures are only intended to facilitate the description of the various embodiments described herein. The figures do not describe every aspect of the teachings disclosed herein and do not limit the scope of the claims. To prevent the drawing from becoming obscured, not all of the components, connections, and the like may be shown, and not all of the components may have reference numbers. However, patterns of component configurations may be readily apparent from the drawings. The accompanying drawings, together with the specification, illustrate example embodiments of the present disclosure, and, together with the description, serve to explain the principles of the present disclosure.

FIG. 10, illustrate an example embodiment of a channel access procedure in which a TX UE may acquire a channel after a transmission slot boundary in accordance with the disclosure.

DETAILED DESCRIPTION

Overview

Figure 1:
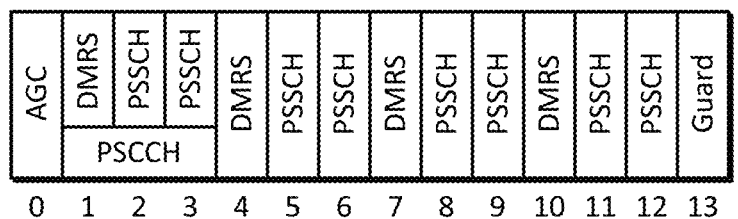
FIG. 1 illustrates a first example embodiment of a sidelink slot format for a wireless communication system.

Wireless communication systems may implement sidelink channels to enable two apparatus to communicate directly with each other without uplink and/or downlink communications with a base station. For example, in a 5 G New Radio (NR) wireless system, a user equipment (UE) may communicate directly with other UEs through sidelink (SL) communication channels using an interface referred to as PC5. Radio resources (e.g., time and/or frequency resources) for the sidelink channels may be selected using mode 1 resource allocation, in which a base station may assign sidelink radio resources, or mode 2 resource allocation, in which a UE may select the sidelink radio resources.

In some wireless communication systems, sidelink communications may operate in unlicensed spectrum. For example, in NR Unlicensed (NR-U), UEs may communicate using sidelink channels that may operate in unlicensed radio spectrum that is shared with other wireless access technologies such as Wi-Fi. To enable NR-U sidelink communications to share unlicensed spectrum, a UE may perform a listen-before-transmit (LBT) procedure before transmitting on a sidelink channel. However, in some configurations, NR transmissions may only begin at slot boundaries. Therefore, implementing an LBT procedure in an NR-U wireless system may involve the use of a slot structure that may be configured to accommodate an LBT sensing operation.

This disclosure encompasses numerous inventive principles relating to slot structure, channel access procedures, resource allocation, and/or the like, for sideband communications with LBT operation. These principles may have independent utility and may be embodied individually, and not every embodiment may utilize every principle. Moreover, the principles may also be embodied in various combinations, some of which may amplify the benefits of the individual principles in a synergistic manner.

Some of the inventive principles of this disclosure relate to a slot structure that may include an LBT gap for an LBT sensing operation. For example, in some embodiments, an LBT gap may be included in a first slot preceding a second slot for which a UE has selected resources for a transmission. During the LBT gap in the first slot, the apparatus (e.g., UEs) involved in the sidelink communications may refrain from transmitting to enable the UE that will transmit in the second slot to sense the SL channel to determine if the SL channel is busy or available (e.g., idle). The LBT gap may be implemented with any suitable details such as start time, end time, duration, and/or the like. For example, the duration of the LBT gap may be set to any number of consecutive symbols (or other units of time) in one or more slots preceding the slot in which a UE will transmit. Thus, the duration of an LBT gap may extend across one or more entire slots, across one or more portions of one or more slots, or any other amount of time. As another example, an LBT gap may begin at a slot boundary, at the end of a physical sidelink control channel (PSCCH), or at any other time.

Some additional inventive principles of this disclosure relate to channel access procedures based on LBT sense operations and slot boundaries. For example, a UE may acquire an SL channel by performing an LBT sense operation during a first slot preceding a second slot for which a UE has selected resources for a transmission. However, in some embodiments, a UE may only begin a transmission (e.g., of a transport block (TB)) at a slot boundary. In a first case, if the LBT sensing operation is completed before the boundary between the first slot and the second slot, the UE may transmit a reservation signal during the remaining portion of the first slot to prevent other apparatus from acquiring the channel before the UE can begin transmitting a transport block during the second slot. The UE may then begin transmitting a transport block during the second slot. In a second case, if the LBT sensing operation is completed at or close to the slot boundary, the UE may begin transmitting a transport block during the second slot (e.g., without transmitting a reservation signal). In a third case, if the LBT sensing operation is not completed until after the slot boundary, the UE may perform a resource reselection operation (e.g., instead of transmitting during the second slot). The UE may then repeat the LBT sensing operation during a later slot.

Some further inventive principles of this disclosure relate to resource allocation for LBT sensing. In some embodiments, resource selection for LBT sensing may be combined with resource selection for the accompanying transmission. For example, in a 5 G NR system with SL communications, a UE may perform a mode 2 resource allocation procedure in which it may define a selection window that may include candidate resources for transmitting a TB. The UE may then sense the candidate SL resources during a sensing window preceding the selection window to identify which of the candidate resources are busy (and therefore should be excluded) and which of the candidate resources are available. The UE may then perform a resource selection operation in which may select resources from the available SL resources for transmitting the TB. In a resource selection operation in accordance with the disclosure, SL resources for an LBT sensing operation may be selected along with the SL resources for transmitting the TB. In some embodiments, and depending on the implementation details, a combined resource selection operation for LBT sensing and transmission in accordance with the disclosure may facilitate a relatively easy integration of resource selection for LBT sensing into an existing resource selection framework (e.g., mode 2 resource selection for SL communications in unlicensed spectrum) with relatively little disruption.

Example Embodiments

Some example embodiments of systems, apparatus, devices, processes, methods, and/or the like illustrating some possible implementation details are described herein. These examples are provided for purposes of illustrating the principles of this disclosure, but the principles are not limited to or defined by these embodiments, implementation details, and/or the like. For example, some embodiments may be described in the context of 5 G NR wireless communication systems, but the principles may also be applied to any other types of wireless communication systems including 3 G, 4 G and/or other generations of wireless networks, Wi-Fi, Bluetooth, and/or any other communication systems. As another example, some embodiments may be described in the context of sidelink communication channels in unlicensed spectrum, but the principles may be applied to other types of communication channels in other types of wireless spectrum.

For purposes of illustration, some example embodiments may be described in the context of sidelink communications between UEs, but the principles may be implemented with sidelink communications between any types of devices including vehicles (e.g., vehicle-to-vehicle (V2 V), vehicle-to-pedestrian (V2 P), vehicle-to-infrastructure (V2 I), vehicle-to-everything (V2 X), and/or the like), road side units (RSUs), mobile devices including smart phones, computers (e.g., desktop computers, laptop computers, tablet computers, and/or the like), internet-of-things (IoT) devices, and/or the like. Thus, in some embodiments, a UE may refer to any device that may be capable of sidelink communications.

Slot Formats

FIG. 1 illustrates a first example embodiment of a sidelink slot format for a wireless communication system. The slot illustrated in FIG. 1 may be used, for example, to transmit a TB and may include one or more of the following symbols: automatic gain control (AGC), demodulation reference signal (DMRS), physical sidelink shared channel (PSSCH), and/or a guard symbol (GUARD). The slot illustrated in FIG. 1 may also include a physical sidelink control channel (PSCCH) that may span one or more symbols.

In some embodiments, the PSCCH may be used, for example, to carry first stage sidelink control information (SCI). The AGC may be used to adjust the strength (e.g., the energy) of the signal on which the TB is received. The PSSCH may carry the data payload of the TB and/or second stage SCI. The DMRS may be used to decode the information carried on the sidelink physical channels (e.g., PSSCH, PSCCH, and/or physical sidelink feedback channel (PSFCH) described below). The GUARD symbol may be used for timing adjustments and/or to provide switching time between transmission and reception.

Figure 2:
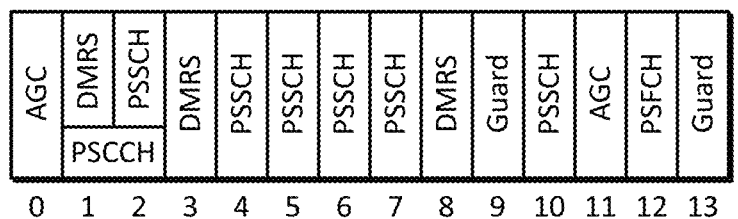
FIG. 2 illustrates a second example embodiment of a sidelink slot format for a wireless communication system.

FIG. 2 illustrates a second example embodiment of a sidelink slot format for a wireless communication system. The slot illustrated in FIG. 2 may also be used to transmit a TB and may include one or more of the symbols AGC, DMRS, PSSCH, and/or PSCCH in a manner similar to the slot illustrated in FIG. 1. However, the slot illustrated in FIG. 2 may also include a symbol occupied by a physical sidelink feedback channel (PSFCH) that may carry feedback information indicating a successful or failed reception of a sidelink transmission. Because the PSFCH may be transmitted in the opposite direction as the PSSCH, the slot illustrated in FIG. 2 may include a GUARD symbol and/or an AGC symbol between the last PSSCH and the PSFCH symbols.

For purposes of illustration, the embodiments illustrated in FIG. 1 and FIG. 2 are described in the context of a 5 G NR sidelink, but any other slot format may be implemented in accordance with the inventive principles of this disclosure. For example, the slots illustrated in FIG. 1 and FIG. 2 are illustrated with 14 symbols, but slots with other numbers of symbols (e.g. 13 symbols, 12 symbols, etc.), numbers of available symbols per slot, mini slots, and/or the like, may be used.

Figure 3:
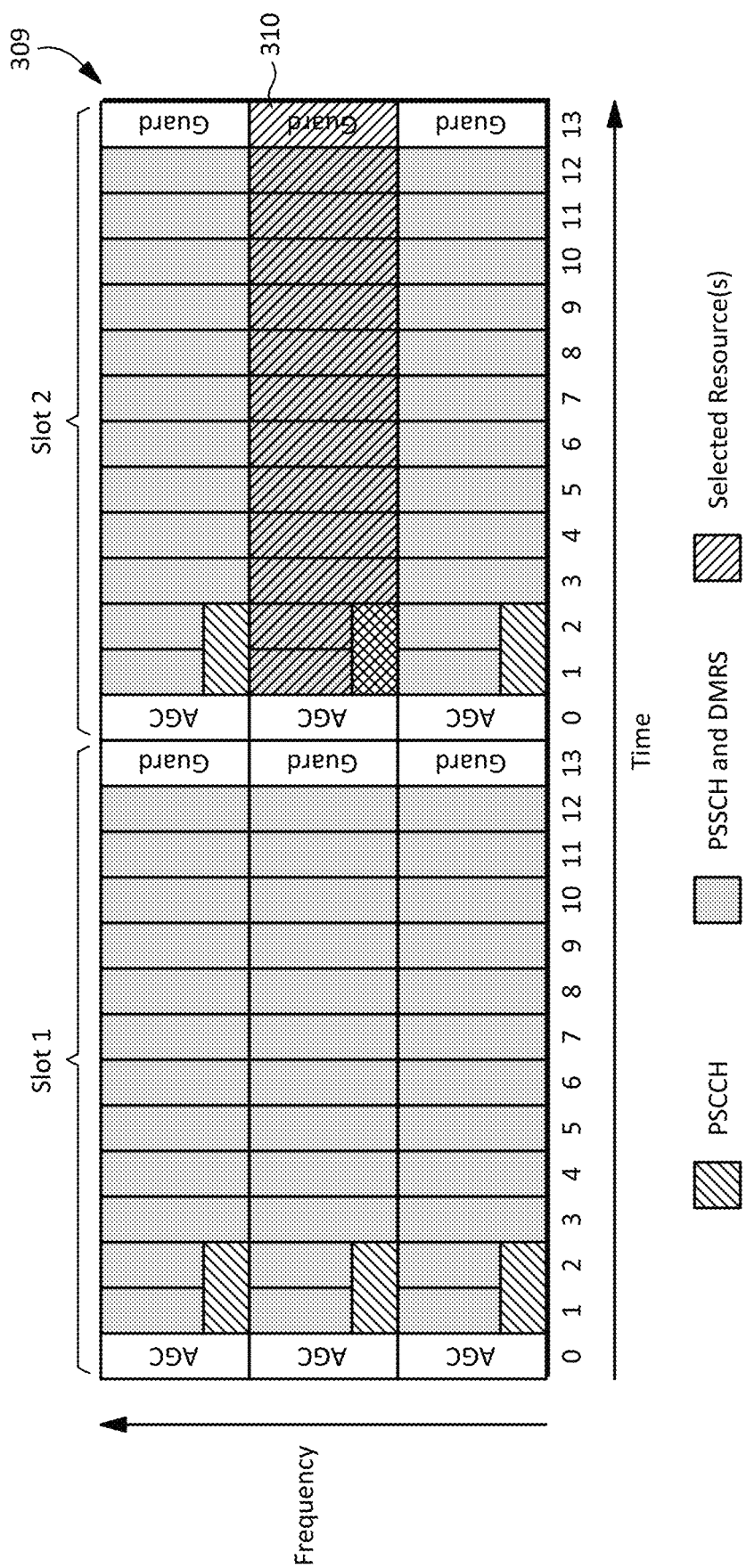
FIG. 3 illustrates an example of a resource grid for sidelink communications in a wireless communication system.

FIG. 3 illustrates an example of a resource grid for sidelink communications in a wireless communication system. The embodiment illustrated in FIG. 3 may be implemented, for example, using slots such as those illustrated in FIG. 1 and FIG. 2, but any other slot format may be used. The resource grid illustrated 309 in FIG. 3 includes frequency resources (e.g., subcarriers) arranged along the vertical access and time resources (e.g., slots, symbols, and/or the like) arranged along the horizontal axis. Some symbols within each slot are indicated as AGC and/or guard symbols. The unmarked and shaded symbols may be PSSCH and/or DMRS. The symbols (or portions thereof) indicated with diagonal shading from top right to bottom left may be PSCCH.

When a UE generates a TB to transmit in an SL channel, the UE may select resources from the resource grid 309 to use for transmitting the TB. In some embodiments, the UE may select the resources from a pool of resources within the grid that may be configured (e.g., pre-configured) for SL transmissions. In this example, the UE may select the resources 310 shown with diagonal shading from top left to bottom right to use for transmitting the TB. The UE may select the resources, for example, using a mode 2 resource allocation procedure. When operating in licensed spectrum, the UE may then simply proceed to use the selected resources to transmit the TB.

However, when operating in unlicensed spectrum (e.g., sidelink unlicensed (SL-U)), the UE may perform an LBT sensing operation to confirm that the selected resources are available (e.g., idle or not busy) before transmitting the TB using the selected resources. Thus, the inventive principles of this disclosure may involve the implementation of an LBT gap during which a UE may sense an SL channel before transmitting.

LBT Gap Formats

Figure 4:
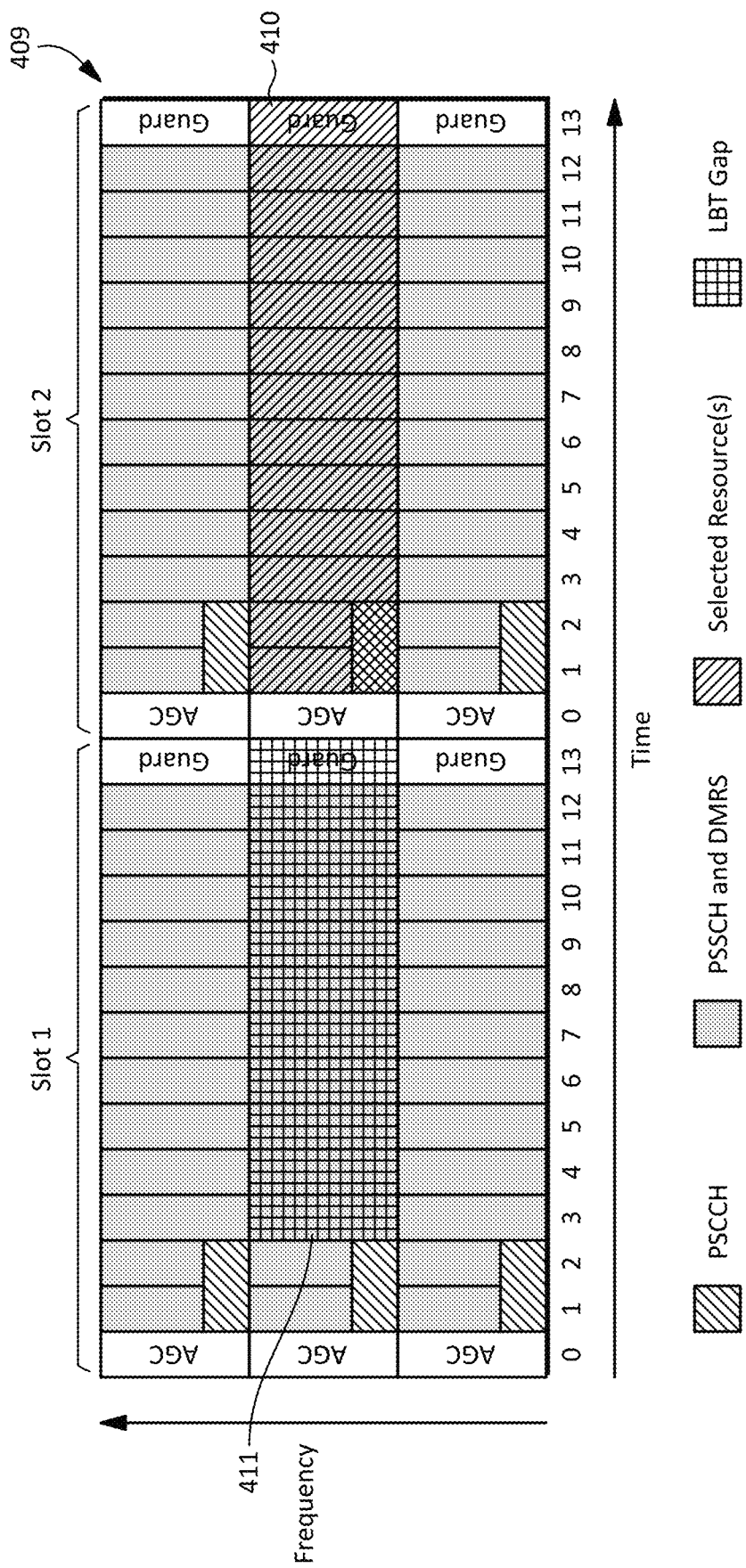
FIG. 4 illustrates a first example embodiment of a sidelink slot structure with an LBT gap in accordance with the disclosure.
Figure 5:
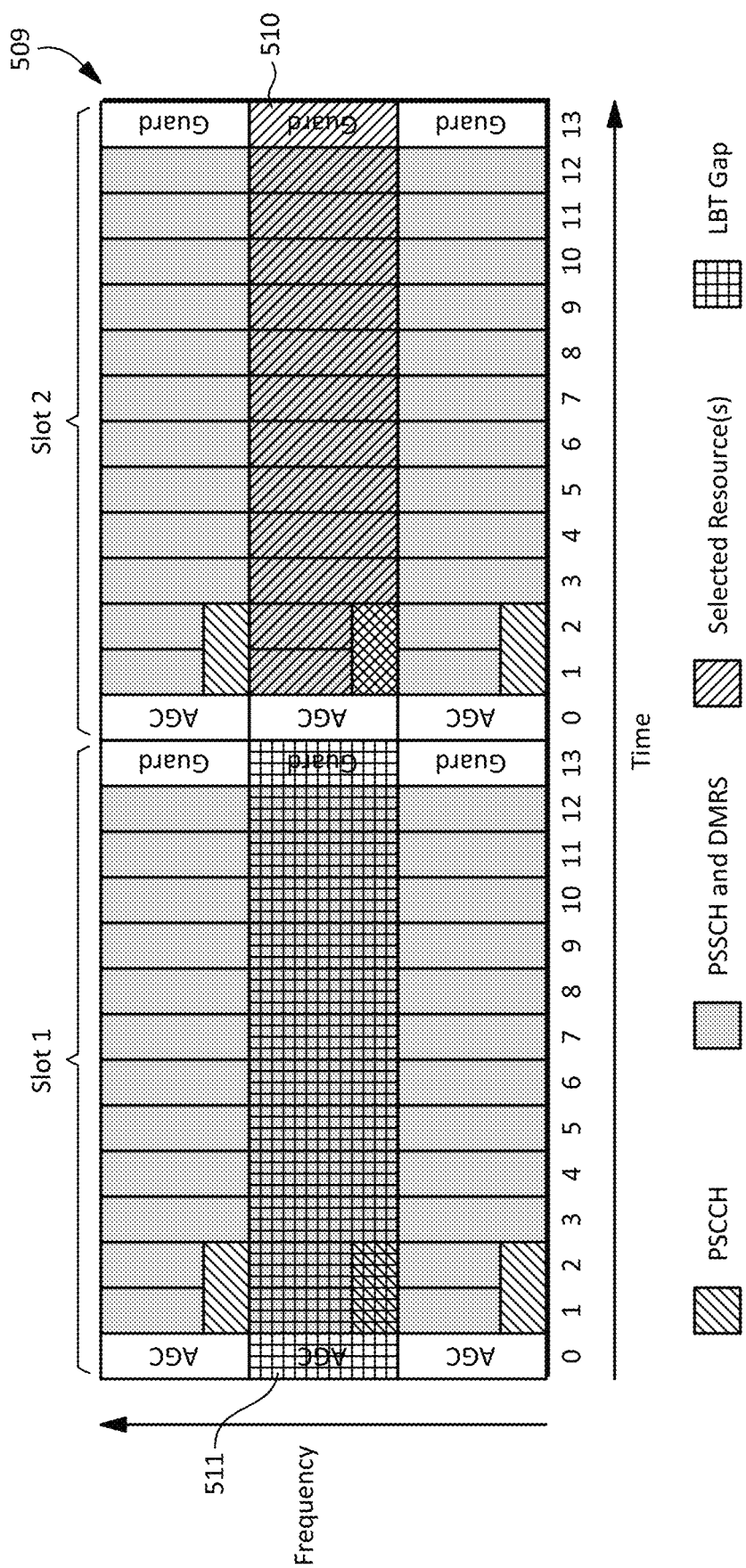
FIG. 5 illustrates a second example embodiment of a sidelink slot structure with an LBT gap in accordance with the disclosure.

FIG. 4 illustrates a first example embodiment of a sidelink slot structure with an LBT gap in accordance with the disclosure. FIG. 5 illustrates a second example embodiment of a sidelink slot structure with an LBT gap in accordance with the disclosure. For purposes of illustrating the inventive principles, the embodiments illustrated in FIG. 4 and FIG. 5 may be described in the context of the SL resource grid illustrated in FIG. 3, but the principles are not limited to these or any other implementation details.

Referring to FIG. 4, resources 410 selected from a resource grid 409 by a UE for a TB transmission in Slot 2 are shown with diagonal shading from top left to bottom right. An LBT gap 411 in Slot 1, which directly precedes Slot 2, is indicated with vertical and horizontal cross-shading. In this example, the LBT gap 411 may begin at symbol #3 and end at symbol #12. The LBT resources 411 may occupy at least some (in this example all) of the same frequency range as the selected resources 410.

During the LBT gap 411, other UEs involved in sidelink communications may refrain from transmitting to enable the UE that has selected the resources 410 (which may be referred to as the transmitting UE or TX UE) to sense the SL channel to determine if the SL channel is busy or available. If, during the LBT gap 411 in Slot 1, the UE is able to complete an LBT sensing operation that determines that the channel selected resources are available, the TX UE may begin transmitting in Slot 2 using the selected resources 410. Some refinements relating to the timing of the LBT sensing operation relative to the slot boundary are described below.

Because the LBT gap 411 illustrated in FIG. 4 does not include symbols #1 and #2 with PSCCH, it may be used, for example, in embodiments in which the UE may not be capable of decoding SCI (e.g., first stage SCI) in the PSCCH simultaneously with performing an LBT sense operation. Thus, the UE may decode SCI in the PSCCH that occupies symbols #1 and #2 before beginning an LBT sense operation in the LBT gap 411 beginning at symbol #3.

Referring to FIG. 5, resources 510 selected from a resource grid 509 by a UE for a TB transmission in Slot 2 are shown with diagonal shading from top left to bottom right. An LBT gap 511 in Slot 1, which directly precedes Slot 2, is indicated with vertical and horizontal cross-shading.

In some aspects, the LBT gap 511 may be similar to LBT 411 illustrated in FIG. 4, however, the LBT gap 511 illustrated in FIG. 5 may begin at symbol #1 and thus may include the PSCCH in symbols #1 and #2. The LBT resources 511 may occupy at least some (in this example all) of the same frequency range as the resources 510 selected for the TB transmission in Slot 2.

Because the LBT gap 511 illustrated in FIG. 5 includes symbols #1 and #2 with PSCCH, it may be used, for example, in embodiments in which the UE may be capable of decoding SCI (e.g., first stage SCI) in the PSCCH simultaneously with performing an LBT sense operation.

The example embodiments of LBT gaps illustrated in FIG. 4 and FIG. 5 are for purposes of illustration only, and the implementation details are subject to unlimited variations. For example, in some embodiments, the LBT gap may end before or after the boundary between Slot 1 and Slot 2. Thus, an LBT gap may occupy one or more symbols, or one or more portions thereof, in a slot containing resources selected for a TB transmission with which the LBT gap is associated. This may be implemented, for instance, if the selected resources for the TB transmission do not occupy all of Slot 2. Alternatively, the LBT gap may end before the boundary between Slot 1 and Slot 2, for instance, to provide the TX UE processing time to determine if the SL channel is busy or available (e.g., idle).

As another example, the LBT gap may begin in another slot earlier than Slot 1. Thus, an LBT gap may span more than one slot, or portions of more than one slot. As a further example, although the LBT gaps illustrated in FIG. 4 and FIG. 5 are shown with continuous time durations (e.g., a number of consecutive or contiguous symbols), in some embodiments, an LBT gap may be discontinuous (e.g., may have multiple portions separated or interrupted by one or more time intervals). As yet another example, in some embodiments, the frequency range or ranges associated with an LBT gap may or may not be considered to be part of the gap. Thus, although the LBT gaps illustrated in FIG. 4 and FIG. 5 may be shown to occupy the same frequency ranges as the resources selected for the associated TB transmission, in some embodiments, some or all of an LBT gap may occupy one or more ranges of frequencies that may be different from the resources selected for the associated TB transmission. For instance, in some embodiments, and depending on the implementation details, a UE may be required to sense a range of frequencies (e.g., 20 MHz) that may be greater than the range of frequencies occupied by the resources selected for the associated TB transmission.

In some embodiments, a TX UE may transmit, to one or more other UEs, an indication of one or more resources the TX UE may use for an LBT gap to enable the one or more other UEs to refrain from transmitting during the LBT gap. For example, in some embodiments, a TX UE may transmit SCI (e.g., first stage SCI, second stage SCI, and/or the like) that may indicate resources the TX UE has selected for the LBT gap. Depending on the implementation details, the SCI may indicate LBT gap resources the TX UE may use for a future transmission and/or a retransmission of a TB.

In some embodiments, an LBT gap may be configurable. For example, one or more predetermined start times, durations, end times, and/or other implementation details, for an LBT gap may be defined by the network and provided to base stations, UEs, and/or the like throughout a communication system. A UE may select one or more of these LBT gap details and indicate the selection to other UEs, for example, in first stage CSI, second stage CSI, a Medium Access Control (MAC) Control Element (CE), and/or the like. In some embodiments, one or more LBT gaps may be configured (e.g., by the network) for one or more partial or entire resource pools, per bandwidth part (BWP), per carrier, and/or the like. Depending on the implementation details, radio resource control (RRC) signaling may be used to implement an LBT gap configuration.

LBT Sensing Operations

As mentioned above, when communicating using an SL channel in unlicensed spectrum (e.g., SL-U), a transmitting UE (TX UE) in accordance with this disclosure may perform an LBT sensing operation during an LBT gap to determine if the SL channel is available before transmitting a TB using the SL channel. The inventive principles of this disclosure are not limited to any specific type of LBT sensing operation. However, in some embodiments, a TX UE in accordance with this disclosure may implement an LBT sensing operation that may be based on (e.g., comply with, at least partially, or generally follow) the LBT procedures provided by the European Telecommunications Standards Institute (ETSI) specification EN 301 893. A potential benefit of implementing an LBT sensing operation based on this standard is that it may facilitate coexistence with other wireless systems sharing unlicensed spectrum such as Wi-Fi (e.g., IEEE 802.11), Long-Term Evolution-Unlicensed (LTE-U), and/or NR-U that may implement channel access procedures (e.g., Type 1 downlink (DL) channel access in NR-U) that may be based on the ETSI standard.

In some embodiments, a TX UE may implement an LBT sensing operation similar to a Type 1 DL channel access procedure in NR-U. For example, the TX UE may be allowed to transmit a TB using the SL channel after the TX UE senses the SL channel as continuously idle during one or more consecutive time periods (e.g., a backoff time). The duration of these time periods may be determined by one or more factors such as a channel access priority class (CAPC), one or more randomly generated numbers (e.g., for a backoff counter), the number and/or duration of times the TX UE senses the SL channel as busy during a backoff time, and/or the like. An example embodiment of a Type 1 DL channel access procedure is described in Appendix A.

A first example embodiment of an LBT sensing operation in accordance with the disclosure may proceed as follows. At the beginning of the LBT sensing operation, a TX UE may initialize a backoff counter N. The TX UE may then repeatedly sense the SL channel until it detects the channel as continuously idle during two consecutive time periods: a first predetermined time period referred to as a defer duration $T_d$, and a second time period, referred to as a backoff time, that may be determined by decrementing the backoff counter N.

If the TX UE detects the SL channel as idle during an initial defer duration $T_d$, it may proceed to the backoff time. If, however, the TX UE detects the SL channel as busy at any time during the initial defer duration $T_d$, it may continue sensing the SL channel until it detects the SL channel as idle during an entire defer duration $T_d$ before proceeding to the backoff time.

During the backoff time, the TX UE may sense the SL channel during time intervals $T_{sl}$ that may be referred to as sensing slots, backoff slots, and/or LBT slots. (In some embodiments, the duration of a sensing slot $T_{sl}$ may be different from (e.g., shorter than) the duration of a transmission slot such as those illustrated in FIG. 3, FIG. 4, and FIG. 5.)

During the backoff time, the TX UE may be allowed to decrement the backoff counter N each time it detects the SL channel as idle during a sensing slot $T_{sl}$. If the TX UE detects the SL channel as busy during one of the sensing slots, the TX UE may freeze the backoff counter (e.g., maintain N at the value it was at before detecting the busy sensing slot) until the SL channel is again detected as idle for a defer duration $T_d$. The TX UE may then resume decrementing N each time the TX UE detects an idle sensing slot $T_{sl}$ on the SL channel. When the backoff counter N reaches zero, the backoff time may be considered to be expired, the LBT sensing operation may be considered to be completed, and the TX UE may be allowed to transmit a TB using the SL channel beginning at the next transmission slot boundary. In some embodiments, the TX UE may then be allowed to occupy the SL channel for a maximum channel occupancy time (COT) that may be indicated as $T_{m\ cot\ p}$ where p may indicate a channel access priority class.

Figure 6A:
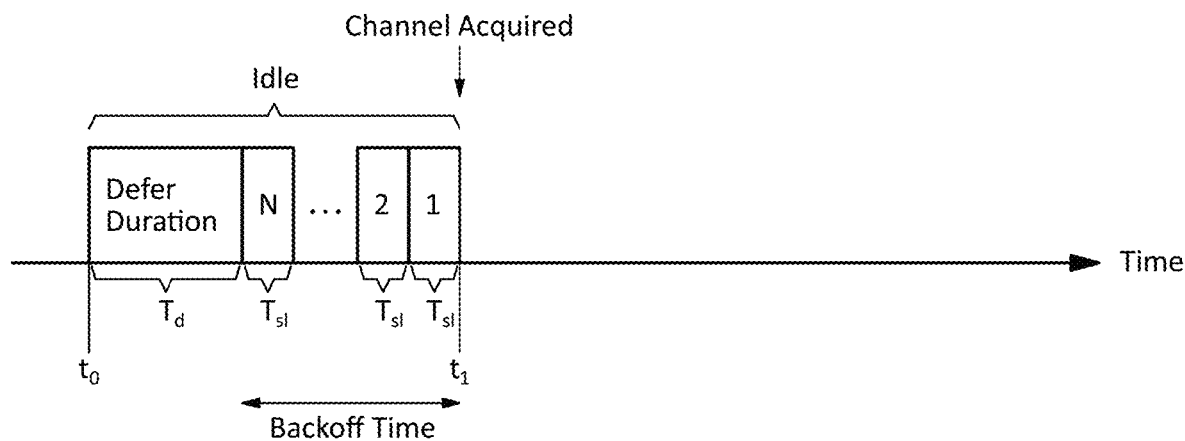
FIG. 6A illustrates a second example embodiment of an LBT sensing operation in accordance with the disclosure.

FIG. 6A illustrates a second example embodiment of an LBT sensing operation in accordance with the disclosure. The embodiment illustrated in FIG. 6A may illustrate an example operation of the first example embodiment described above in which no busy sensing slots are detected during the backoff time. Referring to FIG. 6A, the LBT sensing operation may begin at time $t_0$. The UE may detect a channel as continuously idle during an initial defer duration $T_d$, followed by N consecutive sensing slots $T_{sl}$ ending at time $t_1$, at which time the backoff time may be considered expired and the LBT sensing operation may be considered completed.

Figure 6B:
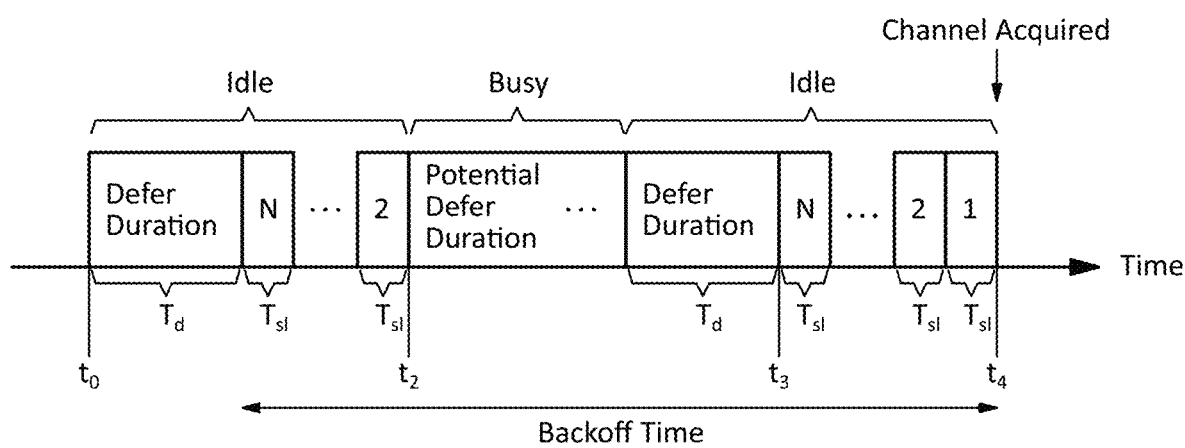
FIG. 6B illustrates a third example embodiment of an LBT sensing operation in accordance with the disclosure.

FIG. 6B illustrates a third example embodiment of an LBT sensing operation in accordance with the disclosure. The embodiment illustrated in FIG. 6B may illustrate an example operation of the first example embodiment described above in which a TX UE may detect one or more busy sensing slots during the backoff time. Referring to FIG. 6B, the LBT sensing operation may begin at time $t_0$. The UE may detect a channel as continuously idle during an initial defer duration $T_d$, followed by one or more consecutive sensing slots $T_{sl}$. However, the UE may detect a busy sensing slot at N=2. Thus, at time $t_2$, the UE may freeze the backoff counter N at 2 and proceed to sense the SL channel during one or more potential defer durations until detecting the channel as continuously idle during a defer duration $T_d$ ending at time $t_3$. The UE may then resume decrementing the backoff counter N in response to detecting additional idle sensing slots $T_{sl}$ until the backoff counter N reaches zero at time $t_4$, at which time the backoff time may be considered expired and the LBT sensing operation may be considered completed.

The example embodiments of LBT sensing operations described above and illustrated in FIG. 6A and FIG. 6B are example embodiments only, and the inventive principles are not limited to the details described therein. Moreover, the inventive principles are not limited to any specific techniques for determining an initial value of the backoff counter N, a value of the defer duration $T_d$, a time duration of a sensing slot $T_{sl}$, and/or the like. Nonetheless, for purposes of illustration, some embodiments of techniques for determining an initial value of the backoff counter N and a value of the defer duration $T_d$ may be implemented as follows.

In some embodiments, the initial value of the backoff counter N may be determined as a random number distributed (e.g., uniformly) between 0 and $CW_p$, where $CW_p$ may indicate a contention window for a channel access priority class p. The contention window $CW_p$ may range between a minimum value $CW_{min,p}$ and a maximum value $CW_{max,p}$ for the channel access priority class p. The contention window $CW_p$ may initially be set to $CW_{min,p}$. If the associated TB transmission is successful (e.g., does not result in a collision), the value of $CW_p$ may remain at $CW_{min,p}$.

However, if the associated TB transmission is not successful (e.g., results in a collision), the value of $CW_p$ may be increased (e.g., by doubling the value of $CW_p$ up to a maximum value $CW_{max,p}$), and the LBT sensing operation may be repeated, this time using the increased value of $CW_p$ to determine the initial value of the backoff counter N. Each time the associated TB transmission fails, the value of $CW_p$ may be increased (e.g., by doubling the value of $CW_p$ up to a maximum value $CW_{max,p}$), and the LBT sensing operation may be repeated. After a successful transmission, the value of $CW_p$ may be set back to $CW_{min,p}$ for the next LBT sensing operation.

In some embodiments, the value of a defer duration $(T_d)$ may be determined as follows:

$$T_d = T_f + m_p \times T_{sl} \quad \text{(Eq 1)}$$

where $T_f$ may be a predetermined value (e.g., 16 μs), $m_p$ may be determined based on a channel access priority class (as shown, for example, in Appendix A), and $T_{sl}$ may be a sensing slot duration as described above. Thus, in some embodiments, the defer duration $T_d$ may have a duration of $T_f$=16 μs immediately followed by $m_p$ consecutive sensing slot durations $T_{sl}$. In some embodiments, $T_f$ may include an idle sensing slot duration $T_{sl}$, e.g., at the beginning of $T_f$.

Although not limited to any specific applications, the example embodiments of LBT sensing operations described above and illustrated in FIG. 6A and FIG. 6B may be used, for example, to detect an available channel during any of the LBT gaps described herein, including those illustrated in FIG. 3, FIG. 4, and/or FIG. 5. In such an application, the time scale of a sensing slot duration $T_{sl}$ may be substantially smaller than the time scale of the transmission slots illustrated in FIG. 3, FIG. 4, and/or FIG. 5, and thus, the LBT sensing operation may often be completed (e.g., the backoff time may expire) before the end of the LBT gap.

However, as described above and illustrated in FIG. 6A and FIG. 6B, even after a UE has selected an initial value of the backoff counter N to use for the backoff time, the time at which the backoff time expires and the LBT sensing operation may be completed may be unpredictable because it may depend, for example, on an interference pattern on the SL channel in the shared spectrum from one or more other radio access networks. Depending on the implementation details and the specific circumstances, an LBT sensing operation as described above may last for any portion of one or more transmission slots (e.g., for less than a symbol in a transmission slot, for one or more symbols in a portion of a transmission slot, for an entire transmission slot, or for more than a transmission slot).

Thus, in some cases, a TX UE may not acquire the SL channel because the LBT sensing operation may not be completed (e.g., the backoff time may not expire) until after the next transmission slot boundary. Moreover, in some other cases, the TX UE may complete the LBT sensing operation, and therefore, acquire the SL channel a substantial amount of time before the next transmission slot boundary. This may be problematic, however, because the TX UE may only be able to begin a TB transmission at a transmission slot boundary.

Channel Acquisition Timing

Some embodiments in accordance with the disclosure may implement different procedures to accommodate different cases based on the time at which the UE may complete an LBT sensing operation relative to a transmission slot boundary.

Figure 7:
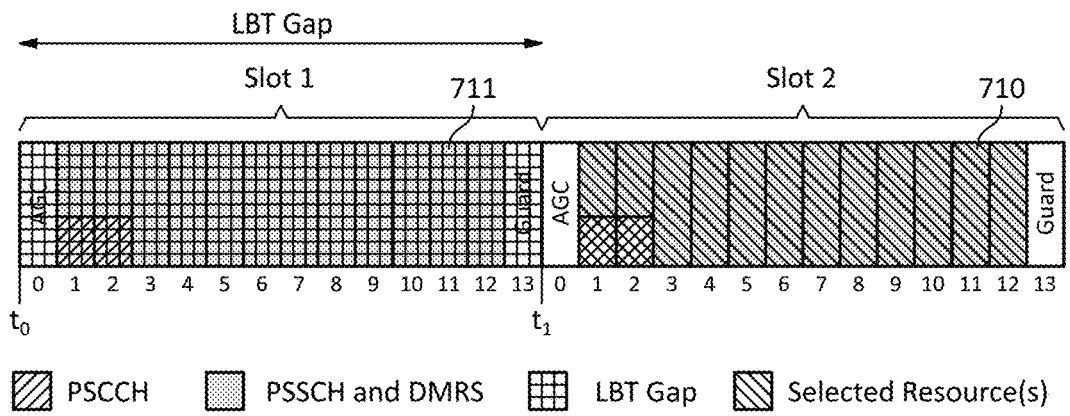
FIG. 7 illustrates an example embodiment of a sidelink slot structure with an LBT gap in accordance with the disclosure.

FIG. 7 illustrates an example embodiment of a sidelink slot structure with an LBT gap in accordance with the disclosure. For purposes of illustrating the inventive principles, the embodiment illustrated in FIG. 7 FIG. 8, FIG. 9, and/or FIG. 10 may be described in the context of NR-U sidelink communications, but the principles are not limited to these or any other implementation details.

The embodiment illustrated in FIG. 7 may be similar to the embodiment of a slot structure illustrated in FIG. 5 and may include two consecutive transmission slots (Slot 1 and Slot 2) along the time (horizontal) axis that may occupy one or more frequency resources (e.g., a subcarrier) along the frequency (vertical) axis. Slot 2 may include resources 710 selected by a TX UE for a TB transmission. Slot 1 may include an LBT gap 711 having LBT resources that may be used to perform an LBT sensing operation for a TB transmission that may use the transmission resources 710. The LBT gap 711 may begin at time $t_0$ and end at time $t_1$.

In the embodiment illustrated in FIG. 7, the LBT gap 711 may include an AGC symbol (symbol #0) and a GUARD symbol (symbol #13). Although one or more other UEs participating in SL communications with the TX UE may not transmit in the AGC or GUARD symbols, the LBT gap 711 may include these symbols because the TX UE may listen during these symbols for transmissions from nodes in other radio access networks that may share unlicensed spectrum with the TX UE. Thus, for purposes of illustration, in the example embodiment illustrated in FIG. 7, the LBT gap 711 may occupy essentially the entire first transmission slot (Slot 1). In other embodiments, however, the LBT gap 711 may occupy any portion of Slot 1 and/or one or more other slots.

For example, in some embodiments, a TX UE may select an LBT gap duration based on any factors including any number of the following factors.

(A) The number of LBT slots selected for the backoff counter during a channel access operation (e.g., as described above and illustrated in FIG. 6A and FIG. 6B).

(B) The level of occupancy on the channel based, for example, on detecting interference from other networks (e.g., Wi-Fi, NR-U networks, and/or the like). In some embodiments, the level of occupancy may be based on a Channel Busy Ratio (CBR) (e.g., as defined in Rel-16 of 5 G NR), a measure of interference on the channel that may account for other systems via energy detection using clear channel assessment (CCA), and/or the like. In some embodiments, a linkage between CBR and the duration of an LBT gap may be implemented with a lookup table that may be configured or preconfigured at the UE, configured by the network using RRC signaling, and/or the like.

(C) The priority of a packet to be transmitted. For example, if a packet failed in a previous LBT channel access operation, it may have a higher priority, and therefore, a TX UE may select a longer LBT gap for the packet because a longer LBT gap may generally increase the probability of TX UE acquiring the channel for the packet. Depending on the implementation details, if the TX UE acquires the channel relatively early in the LBT gap, it may transmit a reservation signal until the slot boundary as described below in the context of Case 1. In some embodiments, a linkage between priority and the duration of an LBT gap may be implemented with a lookup table that may be configured or preconfigured at the UE, configured by the network using RRC signaling, and/or the like.

(D) A packet delay budget (PDB), for example, as described below and illustrated in FIG. 13.

The embodiment illustrated in FIG. 7 may be used, for example, as a starting point to illustrate the operation of different embodiments of channel access procedures described below that may accommodate different cases based on the time at which a TX UE may complete an LBT sensing operation relative to a transmission slot boundary in accordance with the disclosure.

Channel Acquisition Before Slot Boundary

Figure 8:
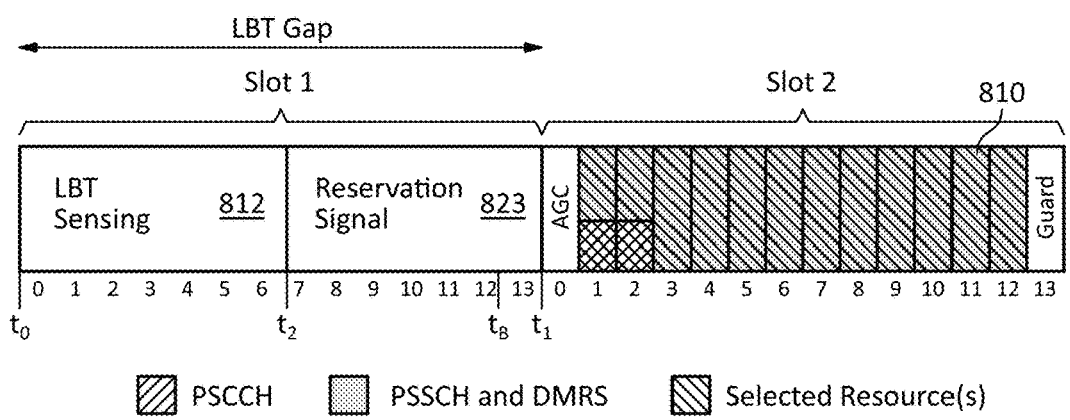
FIG. 8 illustrates an example embodiment of a channel access procedure in which a TX UE may acquire a channel prior to a transmission slot boundary in accordance with the disclosure.

FIG. 8 illustrates an example embodiment of a channel access procedure in which a TX UE may acquire a channel prior to a transmission slot boundary in accordance with the disclosure. In some embodiments, this may be referred to as Case 1. For purposes of illustration, in the embodiment illustrated in FIG. 8, the LBT gap and a reservation signal may be overlayed (e.g., superimposed) over the transmission slot and LBT gap structure illustrated in FIG. 7.

Referring to FIG. 8, the TX UE may start an LBT sensing operation 812 at the beginning of the LBT gap at time $t_0$ (e.g., at the beginning of symbol #0). Although the TX UE may not be required to start the LBT sensing operation 812 at any specific time during the LBT gap, it may be beneficial to start at the beginning of the LBT gap because, depending on the implementation details, it may provide a greater chance of acquiring the channel in time to transmit a TB during Slot 2. Some additional possible implementation details relating to a start time for LBT sensing are described below.

In the embodiment illustrated in FIG. 8, the LBT sensing operation 812 may be completed successfully at time $t_2$, and thus, the TX UE may acquire the channel at time $t_2$ which may be relatively early in the LBT gap. However, the TX UE may only be allowed to begin transmitting at a slot boundary. Moreover, the end of the LBT sensing operation 812 (e.g., the expiration of the backoff time) at $t_2$ may occur at a time that may cause the TX UE to lose the channel if it does not begin transmitting immediately. In some embodiments, $t_B$ may indicate the earliest time in Slot 1 at which the TX UE may acquire the channel for a TB transmission in Slot 2. In some embodiments, $t_B$ may be determined as follows:

$$t_B = t_1 - T_G - T_d \quad \text{(Eq 2)}$$

where $t_1$ may indicate the slot boundary between Slot 1 and Slot 2 (e.g., the start of symbol #0 of Slot 2), $T_G$ may indicate the duration of a guard symbol (e.g., symbol #13 of Slot 1), and $T_d$ may indicate a defer duration as described above.

To avoid losing the channel after acquiring it at time $t_2$, and preserve its ability to begin transmitting in Slot 2 using the resources that have been selected for the TB transmission, the TX UE may transmit a reservation signal 823 beginning at or near the expiration of the backoff time at $t_2$ and continuing, for example, until the beginning of the guard symbol (e.g. symbol #13) of Slot 1, until the time $t_B$, until the end of Slot 1 at time $t_1$ (as illustrated in FIG. 8), or until any other time that may prevent the TX UE from losing the channel.

The inventive principles are not limited to any specific form of the reservation signal 823. However, as one illustrative example, the reservation signal 823 (which may also be referred to as a dummy signal) may be implemented with a reference signal such as a DMRS signal (e.g., a sidelink DMRS), a CSI reference sign (CSI-RS) (e.g., a sidelink CSI-RS), a phase tracking reference signal (PTRS) (e.g., a sidelink PTRS), and/or the like.

As another example, in some embodiments, the reservation signal 823 may be implemented with one or more duplicates of one or more symbols that may be transmitted using the PSCCH and/or PSSCH of Slot 2. In such an embodiment, one or more potential receiving UEs (which may be referred to as RX UEs) may or may not be required to decode and/or store (e.g., buffer) one or more of the duplicate symbols. However, it may be beneficial for a potential RX UE to decode and/or store one or more of the duplicate symbols. For example, if the TX UE transmits one or more duplicate PSSCH symbols from Slot 2 as the reservation signal 823 in Slot 1, and a potential RX UE stores at least one of these duplicate PSSCH signals, then when the potential RX UE receives the PSCCH in Slot 2, it may determine whether it is the intended recipient of the duplicate symbols.

Channel Acquisition At or Near Slot Boundary

Figure 9:
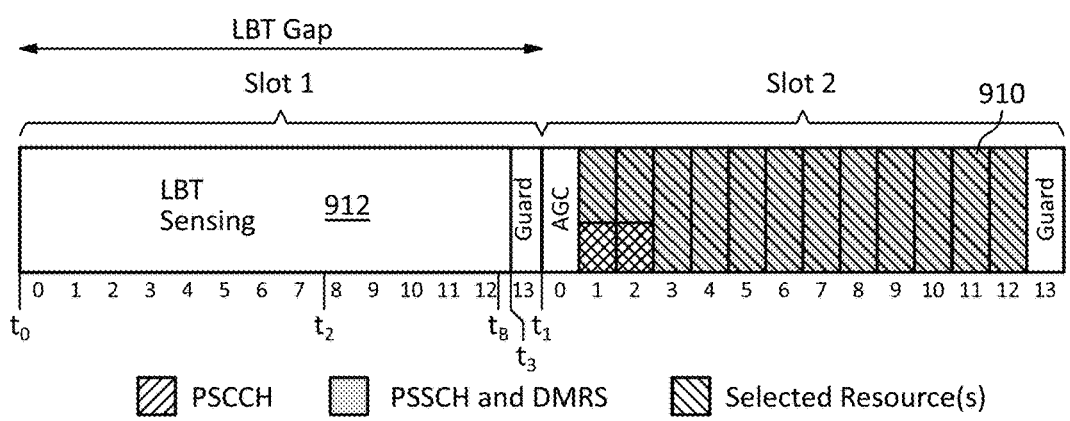
FIG. 9 illustrates an example embodiment of a channel access procedure in which a TX UE may acquire a channel at or near a transmission slot boundary in accordance with the disclosure.

FIG. 9 illustrates an example embodiment of a channel access procedure in which a TX UE may acquire a channel at or near a transmission slot boundary in accordance with the disclosure. In some embodiments, this may be referred to as Case 2. For purposes of illustration, in the embodiment illustrated in FIG. 9, the LBT gap and reservation signal may be overlayed (e.g., superimposed) over the transmission slot and LBT gap structure illustrated in FIG. 7.

Referring to FIG. 9, the TX UE may start an LBT sensing operation 912 at the beginning of the LBT gap at time $t_0$ (e.g., at the beginning of symbol #0). The LBT sensing operation 912 may be completed successfully (e.g., the backoff time may expire) at time $t_3$, and thus, the TX UE may acquire the channel at time $t_3$ which may be at, or close enough to, the time $t_B$ to enable the TX UE to begin transmitting the TB using the selected resources without risk of losing the channel.

Channel Acquisition After Slot Boundary

Figure 10A:
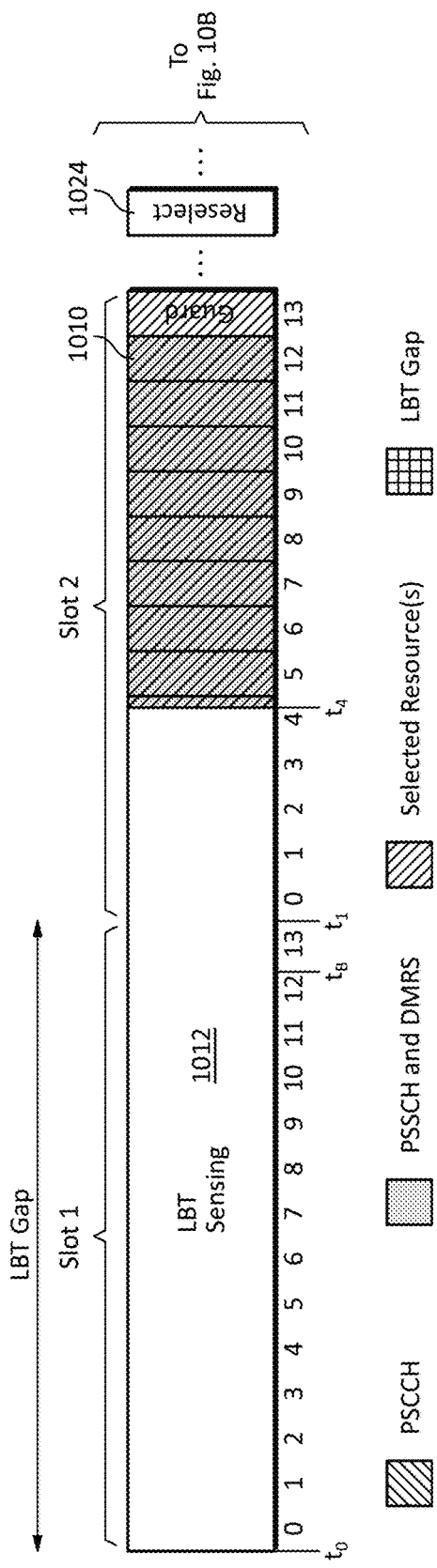
FIG. 10A and FIG. 10B, which collectively form
Figure 10B:
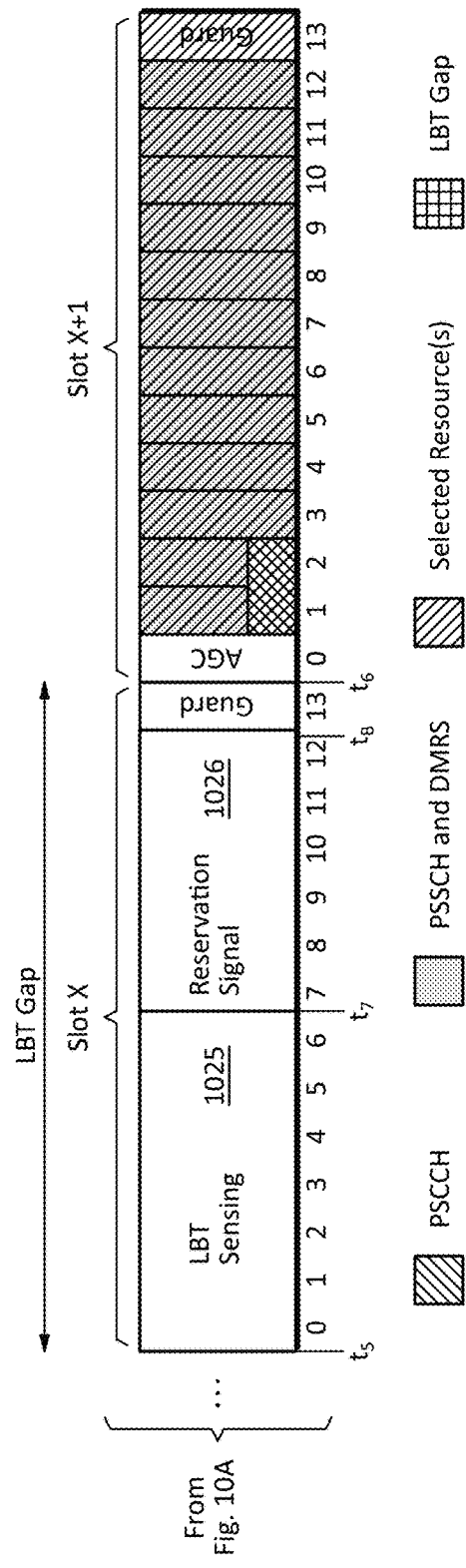

FIG. 10A and FIG. 10B, which collectively form FIG. 10, illustrate an example embodiment of a channel access procedure in which a TX UE may acquire a channel after a transmission slot boundary in accordance with the disclosure. In some embodiments, this may be referred to as Case 3. For purposes of illustration, in the embodiment illustrated in FIG. 10, the LBT gap and reservation signal may be overlayed (e.g., superimposed) over the transmission slot and LBT gap structure illustrated in FIG. 7.

Referring to FIG. 10, the TX UE may start an LBT sensing operation 1012 at the beginning of the LBT gap at time $t_0$ (e.g., at the beginning of symbol #0). The LBT sensing operation 1012 may not be completed (e.g., the backoff time may not expire) until time $t_4$ which may be after the beginning of Slot 2 at $t_1$, and therefore, the TX UE may acquire the channel in time to transmit a TB using the selected resources in Slot 2. This may trigger a resource reselection operation 1024 by the TX UE.

In some embodiments, the LBT sensing operation 1012 may be considered to be completed after the slot boundary if the TX UE acquires the channel (e.g., time $t_4$ occurs) after the time $t_B$ as shown in FIG. 10 and described in (Eq 2).

Depending on the implementation details (for example, if the TX UE is cable of performing an LBT sensing operation and decoding PSCCH simultaneously), the TX UE may begin the resource reselection operation 1024 at any time (e.g., immediately) after an LBT deferring period (e.g., a defer duration $T_d$) expanded into the first symbol (or a later symbol) of the next slot. The resource reselection operation 1024 may be implemented, for example, using any of the embodiments of combined resource selection for LBT sensing and transmission disclosed herein.

In some embodiments, the resource reselection operation 1024 may be implemented with a higher transmission priority than the priority used for the previous resource selection. In some embodiments, if the LBT deferring period is not completed until the first symbol of the new selected resource, the resource reselection operation may be performed repeatedly up to a maximum number of operations. In some embodiments, the resource reselection operation 1024 may be implemented with a higher transmission priority each time it is repeated.

After the successful completion of one or more iterations of the resource reselection operation 1024, the TX UE may start another LBT sensing operation 1025 at the beginning of the LBT gap at time $t_5$ (e.g., at the beginning of symbol #0) in the next slot (Slot X). The LBT sensing operation 1025 may proceed in accordance with Case 1, Case 2, or Case 3 depending on the timing of the channel acquisition (e.g., the completion of the LBT sensing operation 1025 and the expiration of the backoff time) at time $t_7$ relative to the end of Slot X at time $t_6$. In the example embodiment illustrated in FIG. 10, the channel acquisition is illustrated as happening before the slot boundary (e.g., Case 1), and therefore, the TX UE may transmit a reservation signal 1026 until the guard symbol (Symbol #13) in Slot X before proceeding with a TB transmission in Slot X+1.

Figure 11:
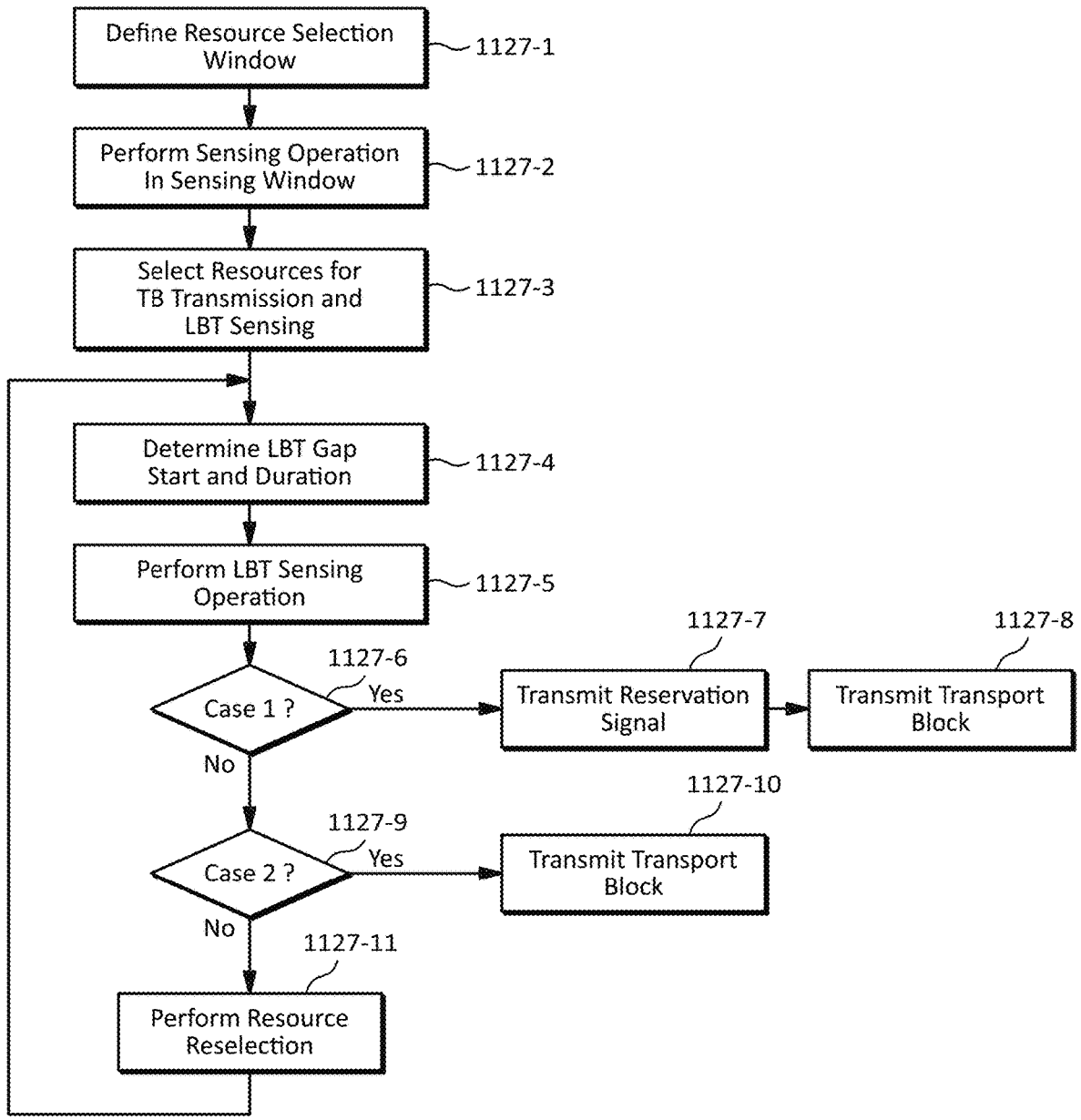
FIG. 11 illustrates an example embodiment of a method for combined resource selection and channel access with LBT sensing in accordance with the disclosure.

FIG. 11 illustrates an example embodiment of a method for combined resource selection and channel access with LBT sensing in accordance with the disclosure. The method illustrated in FIG. 11 may be implemented, for example, using any of the inventive principles disclosed herein relating to slot structure, LBT gap structure, LBT Sensing Operations, channel acquisition timing, combined resource selection for LBT sensing and transmission, and/or the like.

The method illustrated in FIG. 11 may begin at operation 1127-1 where a TX UE may define a resource selection window. For example, the TX UE may define a resource selection window to identify candidate resources for a TB transmission using any of the techniques described with respect to FIG. 12 and FIG. 13. At operation 1127-2, the TX UE may perform a sensing operation (e.g., using a sensing window) to exclude candidate resources that may not be available from the selection window. At operation 1127-3, the TX UE may select one or more resources for a TB transmission and an LBT sensing operation for the transmission. For example, the TX UE may perform a combined resource selection operation as described with respect to FIG. 12 and/or FIG. 13. At operation 1127-4, the TX UE may determine an LBT gap (e.g., start time, duration, end time, and/or the like) to use for an LBT sensing operation. For example, the TX UE may use any of the LBT gap techniques described with respect to FIG. 3, FIG. 4 and/or FIG. 5.

At operation 1127-5, the TX UE may perform an LBT sensing operation using the LBT gap determined at operation 1127-3. For example, the TX UE may use any of the LBT sense techniques described with respect to FIG. 6 and/or FIG. 7.

At operation 1127-6, the TX UE may determine when the LBT sensing operation performed at operation 1127-5 is completed relative to the next slot boundary. If the LBT sensing operation is completed successfully (e.g., the TX UE acquires the channel) before the slot boundary (e.g., as illustrated in FIG. 8), the TX UE may determine that the channel acquisition is a Case 1 channel acquisition and may proceed to operation 1127-7 where the TX UE may transmit a reservation signal for the remainder of the current slot. The method may then proceed to operation 1127-8 where the TX UE may transmit a TB in the next slot using the resources selected at operation 1127-3. Operations 1127-7 and 1127-8 may be implemented, for example, using any of the techniques described with respect to FIG. 8.

If, however, at operation 1127-6, the TX UE determines that the LBT sensing operation is not completed before the next slot boundary, the TX UE may proceed to operation 1127-9 where the TX UE may determine whether the LBT sensing operation is completed successfully (e.g., the TX UE acquires the channel) at or close to the next slot boundary (e.g., as illustrated in FIG. 9). If the TX UE determines that the LBT sensing operation is completed successfully at or close to the next slot boundary, the TX UE may determine that the channel acquisition is a Case 2 channel acquisition and may proceed to operation 1127-10 where the TX UE may transmit a TB in the next slot using the resources selected at operation 1127-3. Operation 1127-10 may be implemented, for example, using any of the techniques described with respect to FIG. 9.

If, however, at operation 1127-9, the TX UE determines that the LBT sensing operation is completed successfully (e.g., the TX UE acquires the channel) after the next slot boundary, the TX UE may determine that the channel acquisition is a Case 3 channel acquisition and may proceed to operation 1127-11 where the TX UE may perform a resource reselection operation. Operation 1127-11 may be implemented, for example, using any of the techniques described with respect to FIG. 10. After successful completion of the reselection operation, the method may return to operation 1127-4 where the TX UE may determine an LBT gap for repeating the channel access operation.

The inventive principles relating to slot formats, LBT gap formats, LBT sensing operations, and channel acquisition timing are independent of each other and other principles disclosed herein and may be embodied individually and/or in combination with other principles. Thus, for example, resources for an LBT gap for channel access operations in accordance with the disclosure may be selected using mode 1 resource allocation, mode 2 resource allocation, or any other resource allocation technique.

Combined Resource Selection

Figure 12:
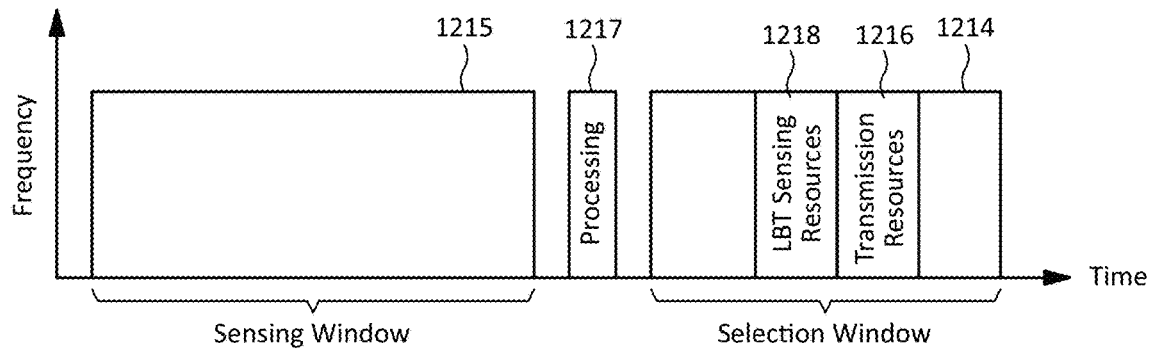
FIG. 12 illustrates an embodiment of a resource allocation scheme with combined resource selection for LBT sensing and transmission in accordance with the disclosure.

FIG. 12 illustrates an embodiment of a resource allocation scheme with combined resource selection for LBT sensing and transmission in accordance with the disclosure. To implement the resource allocation scheme illustrated in FIG. 12, a UE may define a selection window 1214 that may include candidate resources for a transmission. The UE may sense the candidate resources during a sensing window 1215 preceding the selection window 1214 to identify which of the candidate resources are busy (and therefore should be excluded) and which of the candidate resources are available. The UE may then perform a resource selection operation in which it may select resources 1216 from the available resources for the transmission. In some embodiments, the resource selection operation may be performed during a processing time 1217 between the sensing window 1215 and the selection window 1214. In a resource selection operation in accordance with the disclosure, resources 1218 for an LBT sensing operation may be selected along with the resources for the transmission, for example, during the processing time 1217.

Figure 13:
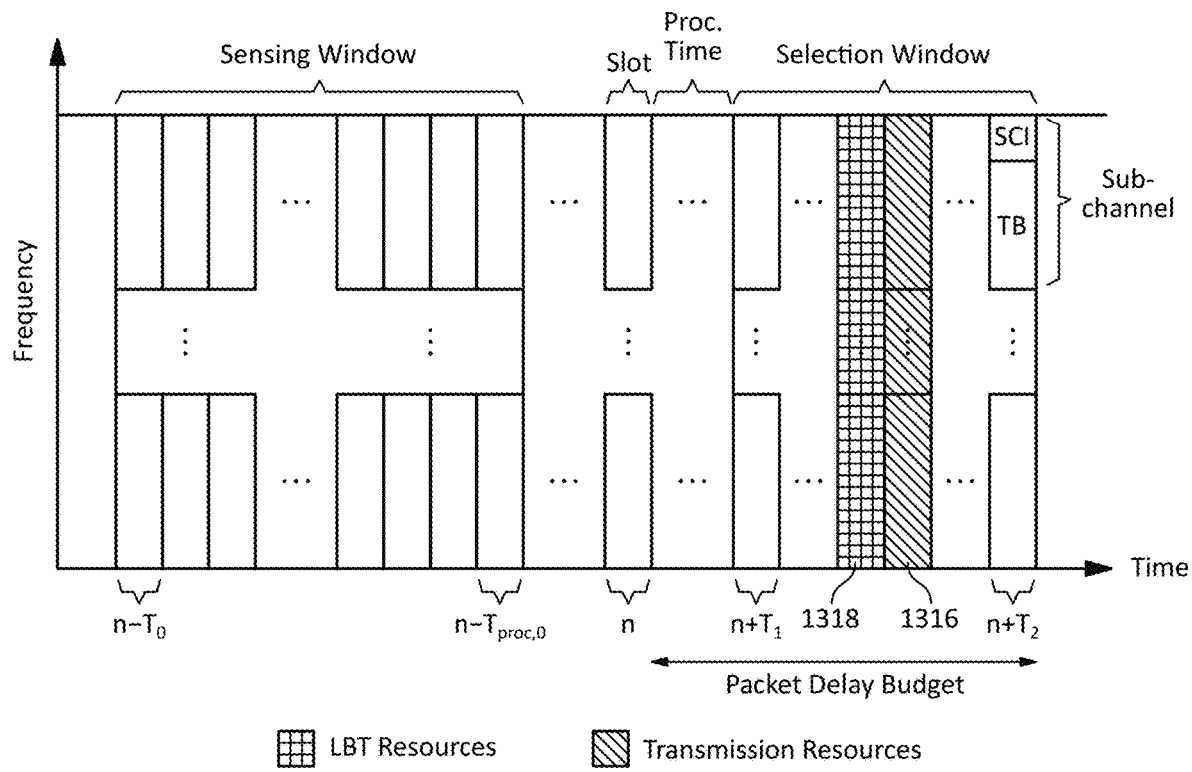
FIG. 13 illustrates an example embodiment of a resource allocation scheme with combined resource selection for LBT sensing and transmission in accordance with the disclosure.

FIG. 13 illustrates an example embodiment of a resource allocation scheme with combined resource selection for LBT sensing and transmission in accordance with the disclosure. For purposes of illustration, the embodiment illustrated in FIG. 13 may be described in the context of 5 G NR-U sidelink communications, but the inventive principles may be applied in any other context.

Referring to FIG. 13, a TX UE may determine (e.g., define) a selection window $[n-T_0, n+T_{proc,0}]$ that may include candidate resources for a TB transmission. For purposes of illustration, the resources illustrated in FIG. 13 may be shown in time units of transmission slots, but depending on the implementation details, some resources (e.g., resources for an LBT gap) may be specified in other time units such as symbols, sensing slots, and/or the like.

Examples of frequency resources may include subchannels which, in some embodiments, may include an SCI portion and/or a TB portion. In some embodiments, a candidate resource may include a group of one or more sub-channels that may be adjacent within the same slot and large enough to contain a TB and accompanying SCI.

In some embodiments, the selection window may include some or all resources within a range of slots between slots $n+T_1$ and $n+T_2$ where n may indicate a slot at which resource selection may be triggered or retriggered or new resources may be selected, $T_1$ may indicate a processing time during which the TX UE may perform one or more processing operations exclude resources based on the results of a sensing operation during the sensing window and/or select resources based on the remaining candidate resources, and $T_2$ may be based, for example, on a packet delay budget (PDB) that may begin at slot n as illustrated in FIG. 13. In some embodiments, the PDB may indicate a latency period during which a TB may be transmitted.

After determining the selection window, the TX UE may perform a sensing operation during the sensing window $[n+T_1, n+T_2]$ to determine which, if any, resources of the selection window may be excluded, for example, because of transmissions from other apparatus using those resources. The sensing window may include some or all resources between slots $n-T_0$ and $n-T_{proc,0}^{SL}$, where $T_0$ and $T_{proc,0}^{SL}$ may indicate predetermined numbers of slots that may be based, for example, on a subcarrier spacing (SPS) configuration.

During the sensing operation in the sensing window, the TX UE may detect transmissions from other apparatus using any techniques for sensing energy, interference, and/or the like, and/or any techniques for evaluating received signals such as a channel busy ratio (CBR), channel clear assessment (CCA), and/or the like.

The TX UE may also exclude candidate resources from the selection window by monitoring transmissions that may be received from other UEs during the sensing window. For example, a TX UE may decode first stage SCI received from other UEs that may indicate resources that the other UEs have reserved in the selection window and therefore may be excluded by the TX UE.

Based on the transmissions detected during the sensing operation in sensing window, the TX UE may perform one or more processing operations (e.g., during the sensing window, the processing time, and/or the like) to determine which resources may be excluded from the selection window and to select (e.g., randomly) one or more resources from the remaining candidate resources. For example, for purposes of illustration, the TX UE may select the resources 1316 to use for transmitting a TB.

In the embodiment illustrated in FIG. 13, the selection of transmission resources for transmitting a TB may be combined with the selection of resources for an LBT sensing operation for the TB transmission. For example, for purposes of illustration, the TX UE may select the LBT resources 1318, which may occupy the slot preceding the transmission resources 1316, to use for an LBT sensing operation.

In some embodiments, combining a resource selection operation for LBT sensing with a resource selection operation for a transmission may refer to performing both resource selection operations at least partially during one or more of the same processing operations that may be performed, for example, during the sensing window, during the processing time, and/or the like.

In some embodiments, a combined resource selection operation for LBT sensing and transmission may be described as a resource selection operation in which the one or more selected resources may include resources for both an LBT gap, where no other UEs may perform transmissions, and resources for channel control and data transmissions (e.g., PSCCH, PSSCH, PSFCH, and/or the like. Additionally, or alternatively, a combined resource selection operation for LBT sensing and transmission may be described as a selection operation in which a TX UE may select one or more resources for a transmission where the one or more selected resources may have a prior idle time domain duration (e.g., in terms of symbols, slots, and/or the like) at least large enough to allow for LBT sensing before the transmission takes place with the same or similar frequency domain resource size as the selected resource(s) for the transmission. In such an implementation, the LBT bandwidth may be equal to or similar to the size of the frequency domain resource of the resource(s) selected for the transmission.

However, in some embodiments, if the size of a frequency domain resource is larger than a predetermined guideline (e.g., 20 MHz in an NR system), the TX UE may perform a multi-channel LBT channel access procedure during the LBT gap. For example, a TX UE may perform a type 1 LBT channel access procedure with exponential back off in one or more (e.g., each) sub-channels and/or sub-bands individually. As another example, a TX UE may perform a type 1 LBT channel access procedure in a selected primary sub-channel and/or subband, and once the LBT is successful in the primary subchannel and/or subband, the TX UE may perform a type 2 (e.g., type 2 A, 2 B and/or 2 C) channel access procedure in one or more other (e.g., secondary) subchannels and/or subbands.

The resource selection techniques described above are provided for purposes of illustrating the inventive principles, but the principles are not limited to the disclosed details or any other implementation details. Moreover, some of the inventive principles may be applied to one or more existing communication frameworks in a manner that may provide additional features or functionality. For example, in some embodiments, one or more of the combined resource selection techniques described above may be implemented based on a single-slot resource allocation procedure such as a 5 G NR sidelink mode 2 procedure. An example embodiment of such an allocation procedure is described in Appendix B and may be based, for example, on Section 8.1.4 of TS 38.214 by the 3 rd Generation Partnership Project (3 GPP). Thus, in some embodiments, and depending on the implementation details, a resource allocation procedure with combined resource selection for LBT sensing and transmission in accordance with the disclosure may convert a single-slot resource allocation procedure to a two-slot resource allocation procedure.

In some embodiments, any number of the following features may be implemented and/or modifications may be made to the mode 2 resource selection procedure illustrated in Appendix B to convert it to a two-slot resource procedure in accordance with the disclosure. Moreover, each of the following features and/or modifications have independent utility and may be implemented in any embodiment of a combined resource selection operation in accordance with the disclosure.

(A) One or more new fields may be added to first stage SCI to indicate an LBT gap duration. Alternatively, or additionally, an RX UE may be configured to recognize that the slot prior to the selected slot may also be reserved and/or selected for an LBT gap, and/or only one LBT gap may be used when the one or more selected resources are within a COT shared by another UE. For example, if a first UE in a shared COT acquires and uses a channel and then has leftover time remaining in the maximum COT, it may share the leftover time with a second UE in the shared COT. In some embodiments, an LBT gap may be implemented adaptively based on an SL RSSI measurement or CBR measurement. For example, an LBT gap may be configured with a longer duration when external interference is relatively strong and a relatively shorter duration when external interference is relatively weak.

(B) In steps 5 and/or 6 of the resource selection operation described in Appendix B, the TX UE may exclude one or more candidate resources that may be occupied in a number of prior time slots, for example, where the number of prior time slots may be determined an LBT gap duration, a slot duration, and/or the like.

(C) In steps 5 and/or 6 of the resource selection operation described in Appendix B, one or more resources during which a TX UE may be performing an LBT operation may also be excluded, for example, if the UE is capable of performing the LBT sensing operation and decoding PSCCH decoding at the same time. Otherwise, this exclusion may not be implemented.

(D) In steps 5 and/or 6 of the resource selection operation described in Appendix B, a TX UE may also exclude one or more resources where the previous slot has the configured PSFCH symbol reserved for transmissions of NACK/ACK from any other UEs, for example, as determined by the first stage SCI and/or second stage SCI broadcast by one or more other TX UEs. Thus, in some embodiments, a slot used for an LBT gap may not include a PSFCH symbol that may be used and/or reserved for other SL transmissions. In some other embodiments, the TX UE may determine whether to preempt traffic reserved for the PSFCH symbol prior to the slot of the selected resource based, for example, on the priority of its own traffic compared to the priority of the traffic that reserves the PSFCH symbol for HARQ feedback. If the TX UE's own traffic priority is greater than the priority of the traffic that reserves the PSFCH symbol resource, then the selected resource for the prior LBT gap may preempt the other UE's traffic that reserves the PSFCH symbol resource, and thus may not be excluded. In some additional embodiment, a UE may exclude some or all of the resources where the previous slot has a PSFCH symbol, e.g., regardless of whether it is actually reserved. In such an embodiment, an existing defined configuration of periodic PSFCH channel resources may be preserved.

(E) In cases in which resource reselection may be performed (e.g., if the LBT backoff time expires after the slot boundary, a TX UE may re-select the resources with higher priority than the previous attempt. Depending on the implementation details, this may result in a greater chance of acquiring the channel than in the previous attempt, and/or a greater chance of keeping the reserved resource in the preemption, e.g., to reduce the chances of being pre-empted. In some embodiments, this may be implemented in one or more of any of the following manners: (1) by increasing the LBT gap duration for the second LBT trial which may increase the channel access probability for the second LBT attempt; (2) by increasing the reservation priority of its transmission, e.g., the TX UE may increase the Priority value (which may be indicated, for example, by 3 bits as specified in clause 5.4.3.3 of [12, TS 23.287] and/or clause 5.22.1.3.1 of [8, TS 38.321], and may be signaled in SCI1-A). Some embodiments may include an additional priority field to maintain the quality-of-service (QoS) for one or more higher layers; (3) by including a flag in the SCI 1-A to indicate it is a reselection due to an LBT failure, for example, via an additional bit in SCI1-A; and/or (4) by adding an extra field in SCI 1-A for indicating the mapping to the original priority value associated with the QoS requirement.

In some embodiments (e.g., at a specification level description) an SCI format 1-A may be modified with a new field to indicate the LBT gap duration. For example, one or more of the Reserved Bits (e.g., a number of bits as determined by the higher layer parameter sl-NumReservedBits, for example, with a value set to zero) may be used to indicate the length of the LBT gap duration configuration prior to the SL data transmission. As another example, one or more existing bits in SCI format 1-A may be repurposed (e.g., redefined) to indicate the LBT gap duration (e.g., the Beta_offset indicator can be used, for instance, if there is a certain number (e.g., only one) of pre-configured sl-BetaOffsets2 ndSCI value. As a further example, an additional modulation and coding scheme (MCS) table indicator may be used, for instance, if there is a certain number (e.g., only one) of pre-configured MCS tables. As yet another example, a new SCI 1-C format may be implemented which may include a field indicating the length of the LBT gap duration configuration prior to the SL data transmission.

For purposes of illustrating how a resource selection operation for a TB transmission may be modified to create a combined resource selection operation for an LBT gap and the TB transmission, Appendix C illustrates how a portion of the resource allocation procedure described in Appendix B may be modified. The embodiment illustrated in Appendix C is presented in a table format in which the text in the second column is indicated as original, insertions, and deletions in the first column.

Start Time for LBT Sensing

In some embodiments, the start time (e.g., a triggering point) of an LBT sensing operation may affect the probability that the UE performing the LBT sensing operation will acquire the channel. Moreover, the behavior of neighboring UEs may also affect the potential success of an LBT sensing operation. For example, a first UE (which may be referred to as UE A) may transmit at slot X and may indicate a future reservation at slot Y. Along with the future reservation, UE A may indicate its priority in the first stage SCI. Based on this indication from UE A, one or more neighboring UEs may be aware of the priority of UE A and may determine a potential range for the LBT gap duration of UE A. The one or more neighboring RX UEs may accordingly avoid reserving resources in some or all of the potential range of the LBT gap duration for UE A to increase the probability that UE A will acquire the medium and perform its transmission.

For purposes of the following discussion, an LBT gap for UE A may be described as having a first portion $T_d$, which may be implemented as a defer duration as described above, and a second portion $CW_X$, which may identify an amount of time that may be determined, at least in part, based on a contention window. For example, $CW_X$ may be implemented as $CW_{min,p}$, $CW_{max,p}$, $CW_p$, and/or the like. Depending on the context, $CW_X$ may be expressed as a number that may indicate a time as a number of sensing slots $T_{sl}$ as described above. Moreover, in some embodiments, $CW_X$ may be determined by using a backoff counter that may be initialized to a random number distributed between 0 and $CW_p$, $CW_{min,p}$, $CW_{max,p}$, and/or the like, and decremented at intervals of sensing slots $T_{sl}$ as described above. In some embodiments, $CW_X$ may refer to a maximum, minimum, or initial value of any of the implementations described above. Thus, in some embodiments, $CW_X$ may refer to a time determined by $CW_{min,p}$ such that $CW_X+T_d$ may be treated as a minimum LBT gap duration.

In some embodiments, one or more of the neighboring RX UEs may determine a minimum LBT gap that may be used by UE A (assuming the medium is not occupied by external interferences) and avoid reserving resources in the minimum LBT gap to enable UE A to perform its transmission.

From the perspective of UE A (which is the TX UE), UE A may trigger (e.g., start) its LBT sensing operation at an earlier point to increase its chances of acquiring the channel (e.g., occupying the medium). Depending on the implementation details, and assuming the absence of interference, UE A may sense for a minimum time $CW_X+T_d$. Depending on its priority, UE A may trigger its LBT sensing operation for channel (e.g., resource) acquisition at any of the following points described below.

(1) A UE may trigger its LBT sensing operation at a symbol beginning at or before Y-$(CW_X+T_d)$. In some embodiments, this may be the specified LBT sensing time. However, depending on the implementation details, this technique may not provide any additional sensing in case the medium is occupied, and thus may decrease the chance of identifying the medium as empty.

(2) A UE may trigger its LBT sensing operation at the first symbol of slot Y−1 if it is earlier than Y-$(CW_X+T_d)$. Depending on the implementation details, once the UE detects the medium as empty before slot Y, it may occupy the remainder of the slot by transmitting a reservation signal.

(3) A UE may trigger its LBT sensing operation at the first symbol of slot Y−1 that is not occupied by PSCCH if this symbol is earlier than Y-$(CW_X+T_d)$. Note that once the UE detects the medium as empty before slot Y, it can occupy the remainder of the slot by sending a reservation signal as described above.

(4) A UE may trigger its LBT sensing operation at the first symbol of a slot earlier than Y−1 if it is earlier than Y-$(CW_X+T_4)$. Note that once the UE detects the medium as empty before slot Y, it may occupy the remainder of the slot by sending a reservation signal.

Figure 14:
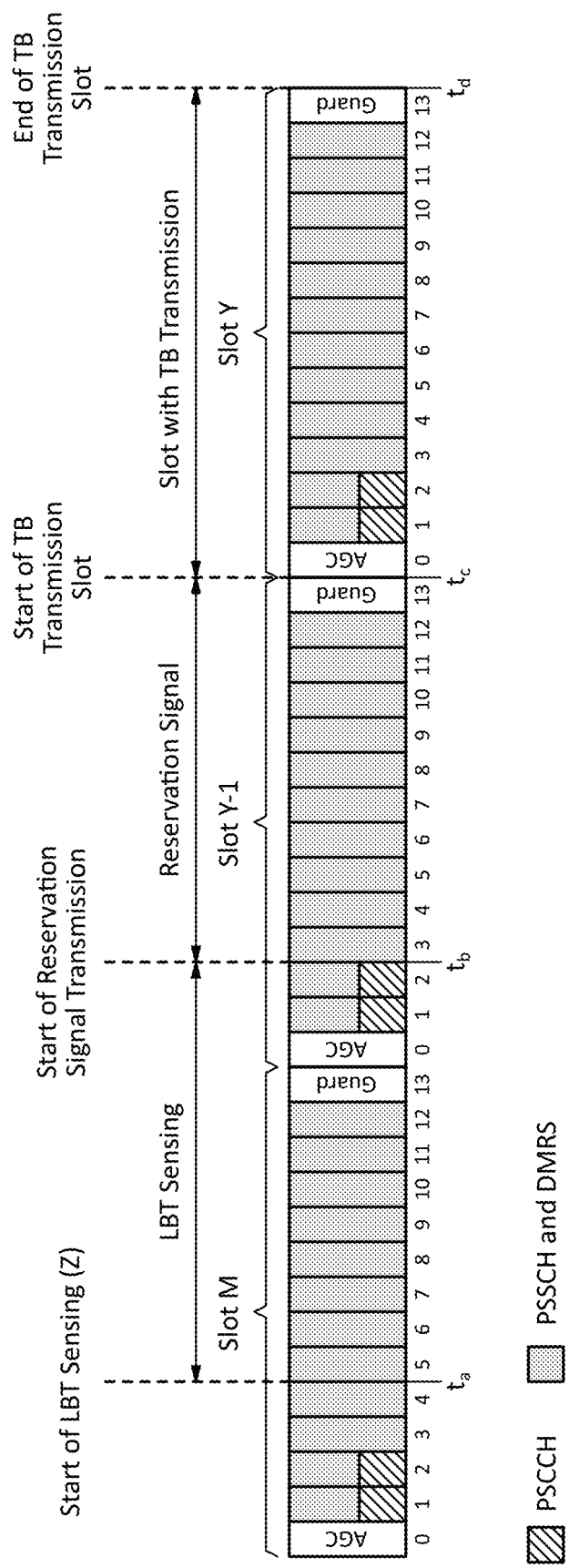
FIG. 14 illustrates an example embodiment of a channel access operation in accordance with the disclosure.

(5) A UE may trigger its LBT sensing operation at a specific symbol (e.g. symbol Z) in a slot M earlier than Y−1 based on a pre-configured duration such that the duration of transmitting the reservation signal and the actual transmission on slot Y may be less than the maximum channel occupancy time (e.g., the duration (U-Z-LBT) may be less than or equal to the maximum channel occupancy time based on the transmission priority of UE A as illustrated in FIG. 14).

FIG. 14 illustrates an example embodiment of a channel access operation in accordance with the disclosure. In the embodiment illustrated in FIG. 14, a TX UE may start an LBT sensing operation at time $t_a$ which may be the beginning of symbol #5 (Z) of Slot M. The LBT sensing operation may be completed at time $t_b$ at which time the TX UE may acquire the channel. However, because the TX UE may only be able to begin transmitting at a slot boundary, the TX UE may transmit a reservation signal from time $t_b$ until the slot boundary at time $t_c$ (beginning of Slot Y). The TX UE may then perform a transmission in Slot Y.

In some embodiments, and depending on the implementation details, the earlier a TX UE starts sensing the medium, the greater its chances of finding it unoccupied and thus increasing its chances of occupying the medium at its intended slot for transmission. In some embodiments, the time at which a TX UE may start an LBT sensing operation may be determined, at least in part, by any number of the following: the transmission priority of the UE and/or the TB transmission, a packet delay budget (PDB), an amount of channel occupancy by other devices (e.g., other NR devices that are not participating in SL communications with the TX UE, other devices accessing the shared spectrum using other technologies such as Wi-Fi, and/or the like), a channel busy ratio (CBR), the size of a contention window used to determine the LBT gap (e.g., the size of $CW_p$, and/or the like.

Early-In-Time Resources for Reselection

In some embodiments, an NR UE using licensed spectrum for sidelink communications may use a mode 2 resource selection procedure to perform periodic and/or aperiodic reservations for future transmissions. For example, a UE may use first stage SCI to indicate up to 2 future slot-subchannels reservations for upcoming transmissions. In addition, a UE may also indicate a period in the first stage SCI to perform a periodic reservation. However, when operating in unlicensed spectrum, an NR UE may perform an LBT sensing operation before transmitting, and thus, may not acquire the channel at the intended slot. For example, a UE that indicated a future reservation at slot X may start an LBT sensing operation at slot X−1 but may not be able to acquire the channel and perform its transmission at slot X. In this case, an NR UE may perform a resource reselection operation. However, the resource available through the reselection operation may be relatively far in time from slot X which may limit the UE's ability to perform its transmission and meet its packet delay budget, for example, if another LBT sensing operation fails.

In some embodiments in accordance with the disclosure, a UE may utilize early-in-time (EIT) resources when performing a resource reselection operation based on a failure to acquire the channel through an LBT sensing operation. In such an embodiment, a UE may prioritize one or more relatively early slots (e.g., the first few slots) within the resource selection window when performing the resource reselection if the cause of the reselection is an LBT failure. For example, if a UE failed to acquire the channel at slot X, the UE may prioritize EIT slots for the resource reselection. Depending on the implementation details, this may be beneficial for one or more of the following reasons:

(1) If a UE reselects an early enough resource (e.g., slot X+1 or slot X+2) for a retransmission, the UE may continue performing the same LBT sensing operation and thereby increase its chances of acquiring the channel at the reselected slot. For example, the UE may maintain the current backoff counter and continue to sense the channel until it becomes free and the UE may acquire the channel.

(2) Selecting EIT resources through reselection may increase the chances of a UE meeting its packet delay budget even if another LBT sensing failure occurs. Thus, selecting EIT resources may allow the UE to perform multiple resource reselections before the end of the packet delay budget.

(3) In some embodiments, a simplified resource reselection procedure may be used if EIT resources are available. For example, if a UE selects the first or second time slot after the slot in which it failed to acquire the channel, then the UE may not perform a complete resource reselection operation.

Figure 15:
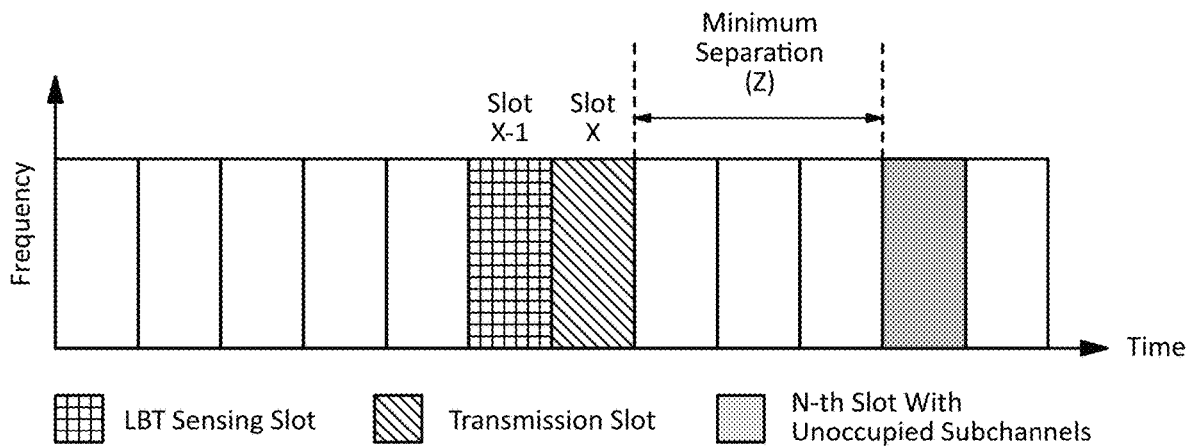
FIG. 15 illustrates a first example embodiment of an EIT resource reselection operation in accordance with the disclosure.

FIG. 15 illustrates a first example embodiment of an EIT resource reselection operation in accordance with the disclosure. In the embodiment illustrated in FIG. 15, the UE may select the N-th slot with the same subchannels unoccupied following the one in which it intended to transmit. In some embodiments, the value of N may be pre-configured per resource pool. For example, if the UE selected subchannel 3 for transmission in slot X and failed to acquire the channel in slot X, then the UE may trigger a resource reselection operation in which it may select the N-th upcoming slot with subchannel 3 unoccupied. In some embodiments, a minimum separation gap (which may be indicated as Z) between slot X and the reselected slot may also be pre-configured to allow time for processing and/or to avoid triggering too many resource reselections (e.g., to allow enough time for the backoff counter to reach 0 when channel occupancy time is more than one slot).

Depending on the implementation details, a potential benefit of the embodiment illustrated in FIG. 15 is that the reselected slot for the retransmission may be deterministic which may enable neighboring UEs to avoid collisions. For example, if a neighboring RX UE received a reservation by a TX UE to transmit in slot X and subchannel Y but does not receive a transmission in slot X due to an LBT failure, then the RX UE may assume that the TX UE automatically reserved slot P that is at least Z slots after slot X and is the N-th slot with subchannel Y unoccupied. (In the example embodiment illustrated in FIG. 15, N may be pre-configured to 1.) Subsequently, neighboring UEs may avoid using these specific resources that may be used for the retransmission to avoid collisions.

Figure 16:
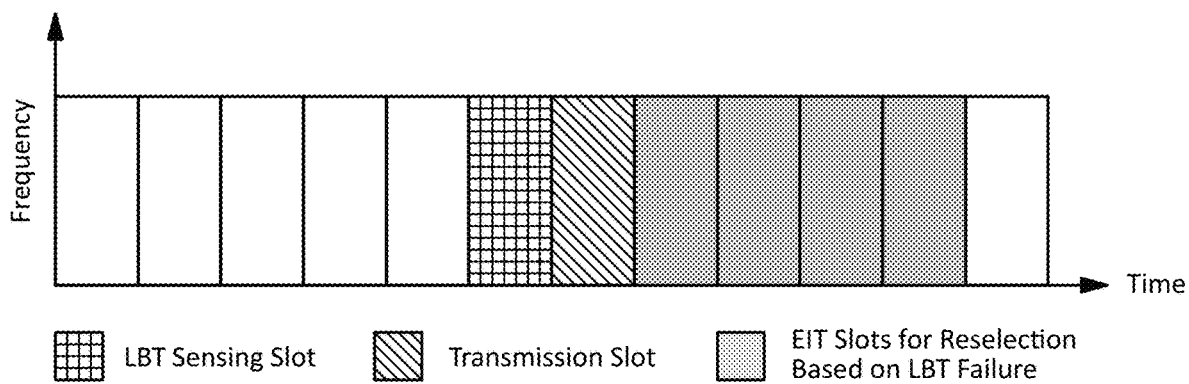
FIG. 16 illustrates a second example embodiment of an EIT resource reselection operation in accordance with the disclosure.

FIG. 16 illustrates a second example embodiment of an EIT resource reselection operation in accordance with the disclosure. In the embodiment illustrated in FIG. 16, the UE may apply a modified resource selection window when performing a resource reselection operation after an LBT failure. For example, a UE may consider two boundaries ($T_a$ and $T_b$) where $T_a <= T_1$ and $T_b < (T_2$ or PDB). In some embodiments, the values of $T_a$ and/or $T_b$ may be pre-configured per resource pool and/or the values of $T_a$ and/or $T_b$ may be selected by the UE in a manner similar to a mode 2 resource selection window. The UE may perform the selection based on the PDB, for example, if the value of $T_b > PDB$.

In some embodiments, new smaller $T_1$ and/or $T_{2min}$ constraints may be applied when performing a resource reselection after an LBT failure. In such an embodiment, the UE may randomly select a resource within the updated window boundaries, for example, to reduce the chances of collisions between neighboring UEs in a manner similar to Mode 2 resource selection. Some embodiments may implement an alternative technique to enable the UE to indicate to neighboring UEs the slot that may be used for the reselection.

Figure 17:
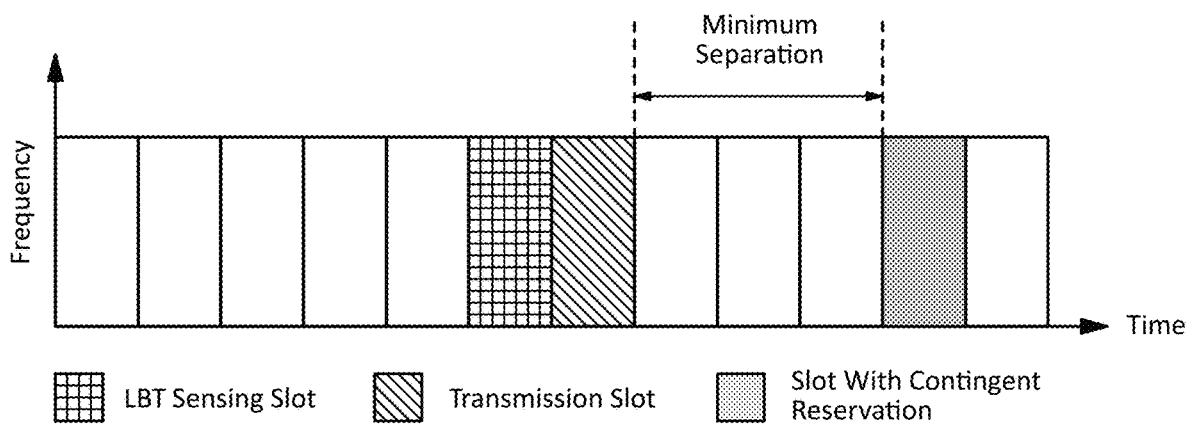
FIG. 17 illustrates a third example embodiment of an EIT resource reselection operation in accordance with the disclosure.

FIG. 17 illustrates a third example embodiment of an EIT resource reselection operation in accordance with the disclosure. In the embodiment illustrated in FIG. 17, the UE may implement a resource selection operation with automatic release when performing the initial resource selection. For example, a UE may reserve two future resources that may be consecutive or close in time to transmit a TB. If the UE successfully acquires the channel and transmits the TB in the first reserved resource, then the future reserved resources may be considered released and may be used by other UEs.

In this embodiment, a determination of success may be based on completion of the LBT sensing operation (e.g., acquisition of the channel) rather than, for example, an ACK/NACK. For example, if a UE performs two future reservations that are close by in time for an upcoming TB transmission (in case LBT fails), then if the neighboring UEs may be able to receive the first stage SCI in the first reserved slot, the LBT sensing operation may be considered successful, and the future reserved resources may be considered released. In this embodiment, a new indication (e.g., either implicit by setting one or more fields to specific values or explicit by adding a new field) may be added to the first or second stage SCI or in a MAC CE to indicate that the additional reservation is a duplicate and may be used only in case of an LBT failure. In some embodiments, this indication may be limited to SCI transmissions within an unlicensed band. In some embodiments, a minimum separation may be enforced between the initial transmission and the duplicate transmission to allow neighboring UEs to reuse the selected resource if the LBT was successful. Thus, the reservation and its duplicate may be separated by enough time to allow for processing at neighboring UEs to identify the resource as released. In some embodiments, the minimum separation may be pre-configured, for example, per resource pool.

In a fourth example embodiment of an EIT resource reselection operation in accordance with the disclosure, a UE may implement the first phase of a mode 2 resource selection procedure to obtain a set of candidate resources for resource selection. For example, the UE may perform a procedure similar to that established in Rel-16 of the 5 G NR Specification to obtain the set S_A that may contain a set of candidate single-slot resources that may be used for resource selection. This set may be passed to a higher layer for resource selection. However, instead of randomly selecting a resource with equal probabilities from the set, the MAC layer may use different probabilities. For example, EIT resources may be given a higher probability when performing the resource selection. In some embodiments, this higher probability may be configured per resource pool. For example, the EIT resources may be given double the selection probability of regular resources.

In some embodiments, the selection of EIT resources may be restricted based on the TB priority. For example, in some embodiments, only UEs with high priority traffic may be allowed to perform the EIT reselection of resources in case of LBT failure or reserve duplicate transmissions. A priority threshold can be pre-configured (e.g., per resource pool) whereby only UEs with TB priority values below this threshold may be allowed to apply the EIT resource reselection approaches or the duplicate reservation approach. This threshold may be implemented, for example, to prevent too many UEs from applying the EIT resource reselection procedures which may result in a large number of UEs attempting to access a limited number of resources. This type of situation may be especially problematic, for example, when the channel is sensed as busy for a large number of slots thus triggering many NR UEs to perform an EIT resource selection procedure.

In some embodiments, an EIT resource reselection procedure (e.g., based on mode 2 resource selection) may be performed in two phases: phase 1 may be performed by the PHY layer to obtain the set S_A, and phase 2 may be performed by the MAC layer to obtain the selected resource.

In the first example embodiment of the EIT resource reselection operation described above, depending on the implementation details, there may be little or no impact on phase 1, whereas for phase 2, the MAC layer may select the N-th resource within the candidate slots that may occupy the same subchannels as the missed slots and is at least Z slots away from the failed slots.

In the second example embodiment of the EIT resource reselection operation described above, depending on the implementation details, there may be little or no impact on phase 2, whereas for phase 1, the resource selection boundaries may be updated with ($T_a$ and $T_b$) where $T_a <= T_1$ and $T_b < (T_2$ or PDB). Moreover, with phase 1, the following portion of the 5 G NR Specification may be updated as shown in Table 1.

TABLE 1

| | |
|---|---|
| Original | 2) A candidate single-slot resource for transmission $R_{x,y}$ is defined as a set of $L_{subCH}$ contiguous sub-channels with sub-channel x + j in slot $t_y^{SL}$ where j = 0, . . . , $L_{subCH}$ − 1. |
| Insertion | The UE shall assume that any set of $L_{subCH}$ contiguous sub-channels included in the corresponding resource pool within the time interval [n + $T_a$, n + $T_b$] correspond to one candidate single-slot resource, where selection of $T_a <= T_1$ and $T_1$ is up to UE implementation under $T_b$ is equal to value configured per resource pool if less than the PDB or equal to the PDB otherwise. |
| Original | The total number of candidate single-slot resources is denoted by $M_{total}$. |

In the third example embodiment of the EIT resource reselection operation described above, depending on the implementation details, there may be little or no impact on phase 1 or phase 2.

In the fourth example embodiment of the EIT resource reselection operation described above, depending on the implementation details, there may be little or no impact on phase 1, whereas with phase 2, the MAC layer may apply a higher selection probability for the EIT resources than the following resources.

User Equipment

Figure 18:
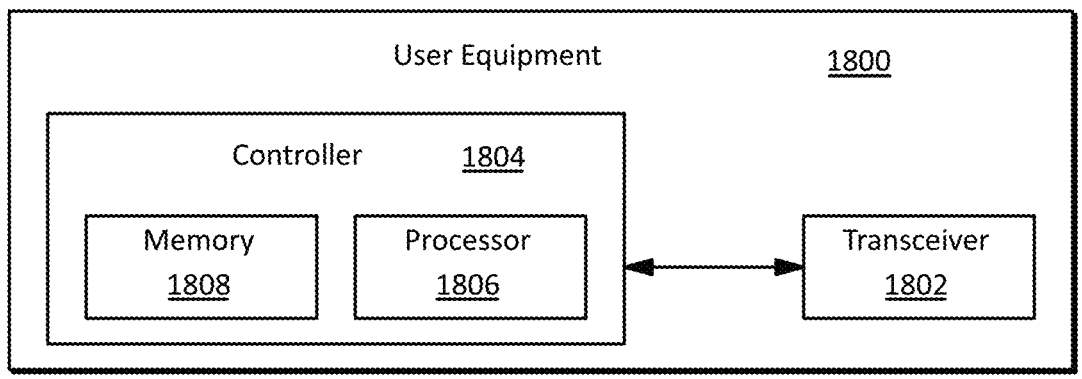
FIG. 18 illustrates an example embodiment of a user equipment (UE) in accordance with the disclosure.

FIG. 18 illustrates an example embodiment of a user equipment (UE) in accordance with the disclosure. The embodiment 1800 illustrated in FIG. 18 may include a radio transceiver 1802 and a controller 1804 which may control the operation of the transceiver 1802 and/or any other components in the UE 1800. The UE 1800 may be used, for example, to implement any of the functionality described in this disclosure. The transceiver 1802 may transmit and/or receive one or more signals to and/or from a base station, other UEs (e.g., for sidelink communications), or any other devices and may include an interface unit for such transmissions/receptions. The controller 1804 may include, for example, one or more processors 1806 and a memory 1808 which may store instructions for the one or more processors 1806 to execute code to implement any of the functionality described in this disclosure. For example, the UE 1800 and/or the controller 1804 may be used to implement any of the functionality relating to slot structure, LBT gap format, channel access procedures, LBT sensing operations, resource allocation, combined resource selection for LBT sensing and transmission, decoding and/or storing duplicate symbols, recognizing an LBT gap used by a neighboring TX UE and avoiding reserving resources in the LBT gap, and/or the like.

Base Station

Figure 19:
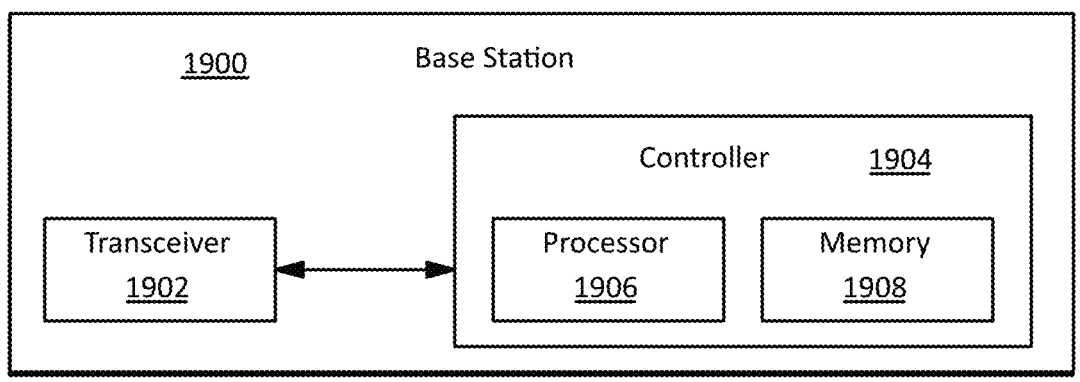
FIG. 19 illustrates an example embodiment of a base station in accordance with the disclosure.

FIG. 19 illustrates an example embodiment of a base station in accordance with the disclosure. The embodiment 1900 illustrated in FIG. 19 may include a radio transceiver 1902 and a controller 1904 which may control the operation of the transceiver 1902 and/or any other components in the base station 1900. The base station 1900 may be used, for example, to implement any of the functionality described in this disclosure. The transceiver 1902 may transmit/receive one or more signals to/from a user equipment, and may include an interface unit for such transmissions/receptions. The controller 1904 may include, for example, one or more processors 1906 and a memory 1908 which may store instructions for the one or more processors 1906 to execute code to implement any of the base station functionality described in this disclosure. For example, the base station 1900 and/or the controller 1904 may be used to implement functionality relating to configuring one or more LBT gaps, e.g., for resource pools, bandwidth parts, and/or the like.

In the embodiments illustrated in FIGS. 18 and 19, the transceivers 1802 and 1902 may be implemented with various components to receive and/or transmit RF signals such as amplifiers, filters, modulators and/or demodulators, A/D and/or DA converters, antennas, switches, phase shifters, detectors, couplers, conductors, transmission lines, and/or the like. The controllers 1804 and 1904 may be implemented with hardware, software, and/or any combination thereof. For example, full or partial hardware implementations may include combinational logic, sequential logic, timers, counters, registers, gate arrays, amplifiers, synthesizers, multiplexers, modulators, demodulators, filters, vector processors, complex programmable logic devices (CPLDs), field programmable gate arrays (FPGAs), application specific integrated circuits (ASICs), systems on chip (SOC), state machines, data converters such as ADCs and DACs, and/or the like. Full or partial software implementations may include one or more processor cores, memories, program and/or data storage, and/or the like, which may be located locally and/or remotely, and which may be programmed to execute instructions to perform one or more functions of the controllers. Some embodiments may include one or more CPUs such as complex instruction set computer (CISC) processors such as x86 processors and/or reduced instruction set computer (RISC) processors such as ARM processors, and/or the like, executing instructions stored in any type of memory.

In the embodiments illustrated in FIG. 18 and FIG. 19, as well as the other embodiments illustrated herein, the illustrated components and/or operations are exemplary only. Some embodiments may involve various additional components and/or operations not illustrated, and some embodiments may omit some components and/or operations. Moreover, in some embodiments, the arrangement of components and/or temporal order of the operations may be varied. Although some components may be illustrated as individual components, in some embodiments, some components shown separately may be integrated into single components, and/or some components shown as single components may be implemented with multiple components.

The embodiments disclosed herein may be described in the context of various implementation details, but the principles of this disclosure are not limited to these or any other specific details. Some functionality has been described as being implemented by certain components, but in other embodiments, the functionality may be distributed between different systems and components in different locations. A reference to a component or element may refer to only a portion of the component or element. The use of terms such as "first" and "second" in this disclosure and the claims may only be for purposes of distinguishing the things they modify and may not indicate any spatial or temporal order unless apparent otherwise from context. A reference to a first thing may not imply the existence of a second thing. Moreover, the various details and embodiments described above may be combined to produce additional embodiments according to the inventive principles of this patent disclosure. Various organizational aids such as section headings and the like may be provided as a convenience, but the subject matter arranged according to these aids and the principles of this disclosure are not defined or limited by these organizational aids.

Since the inventive principles of this patent disclosure may be modified in arrangement and detail without departing from the inventive concepts, such changes and modifications are considered to fall within the scope of the following claims.

Appendix A

The eNB/gNB may transmit a transmission after first sensing the channel to be idle during the sensing slot durations of a defer duration $T_d$ and after the counter N is zero in step 4. The counter N is adjusted by sensing the channel for additional sensing slot duration(s) according to the steps below:

1) set $N=N_{init}$, where $N_{init}$ is a random number uniformly distributed between 0 and $CW_p$, and go to step 4;
2) if N>0 and the eNB/gNB chooses to decrement the counter, set N=N−1;
3) sense the channel for an additional sensing slot duration, and if the additional sensing slot duration is idle, go to step 4; else, go to step 5;
4) if N=0, stop; else, go to step 2.
5) sense the channel until either a busy sensing slot is detected within an additional defer duration $T_d$ or all the sensing slots of the additional defer duration $T_d$ are detected to be idle;
6) if the channel is sensed to be idle during all the sensing slot durations of the additional defer duration $T_d$, go to step 4; else, go to step 5;

If an eNB/gNB has not transmitted a transmission after step 4 in the procedure above, the eNB/gNB may transmit a transmission on the channel, if the channel is sensed to be idle at least in a sensing slot duration $T_{sl}$ when the eNB/gNB is ready to transmit and if the channel has been sensed to be idle during all the sensing slot durations of a defer duration $T_d$ immediately before this transmission. If the channel has not been sensed to be idle in a sensing slot duration $T_{sl}$ when the eNB/gNB first senses the channel after it is ready to transmit or if the channel has been sensed to be not idle during any of the sensing slot durations of a defer duration $T_d$ immediately before this intended transmission, the eNB/gNB proceeds to step 1 after sensing the channel to be idle during the sensing slot durations of a defer duration $T_d$.

The defer duration $T_d$ consists of duration $T_f=16$ us immediately followed by $m_p$ consecutive sensing slot durations $T_{sl}$, and $T_f$ includes an idle sensing slot duration $T_{sl}$ at start of $T_f$. $CW_{min,p} \leq CW_p \leq CW_{max,p}$ is the contention window. $CW_p$ adjustment is described in clause 4.1.4.

$CW_{min,p}$ and $CW_{max,p}$ are chosen before step 1 of the procedure above.

$m_p$, $CW_{min,p}$, and $CW_{max,p}$ are based on a channel access priority class p associated with the eNB/gNB transmission, as shown in Table 4.1.1-1.

An eNB/gNB shall not transmit on a channel for a Channel Occupancy Time that exceeds $T_{m\ cot,\ p}$ where the channel access procedures are performed based on a channel access priority class p associated with the eNB/gNB transmissions, as given in Table 4.1.1-1.

For p=3 and =4, if the absence of any other technology sharing the channel can be guaranteed on a long term basis (e.g. by level of regulation), $T_{m\ cot,\ p}$=1 Oms, otherwise, $T_{m\ cot,\ p}$=8 ms.

TABLE 4.1.1-1

Channel Access Priority Class (CAPC) [TS 38.213]

| Channel Access Priority Class (p) | $m_p$ | $CW_{min,p}$ | $CW_{max,p}$ | $T_{mcot,p}$ | allowed $CW_p$ sizes |
|---|---|---|---|---|---|
| 1 | 1 | 3 | 7 | 2 ms | {3, 7} |
| 2 | 1 | 7 | 15 | 3 ms | {7, 15} |
| 3 | 3 | 15 | 63 | 8 or 10 ms | {15, 31, 63} |
| 4 | 7 | 15 | 1023 | 8 or 10 ms | {15, 31, 63, 127, 255, 511, 1023} |

Appendix B 8.1.4 UE procedure for determining the subset of resources to be reported to higher layers in PSSCH resource selection in sidelink resource allocation mode 2

In resource allocation mode 2, the higher layer can request the UE to determine a subset of resources from which the higher layer will select resources for PSSCH/PSCCH transmission. To trigger this procedure, in slot n, the higher layer provides the following parameters for this PSSCH/PSCCH transmission:
  the resource pool from which the resources are to be reported;
  L1 priority, $prio_{TX}$;
  the remaining packet delay budget;
  the number of sub-channels to be used for the PSSCH/PSCCH transmission in a slot, $L_{subCH}$;
  optionally, the resource reservation interval, $P_{rsvp\_TX}$, in units of ms.
  if the higher layer requests the UE to determine a subset of resources from which the higher layer will select resources for PSSCH/PSCCH transmission as part of re-evaluation or pre-emption procedure, the higher layer provides a set of resources ($r_0, r_1, r_2, \ldots$) which may be subject to re-evaluation and a set of resources ($r_0', r_1', r_2', \ldots$) which may be subject to pre-emption.
  it is up to UE implementation to determine the subset of resources as requested by higher layers before or after the slot $r_i''-T_3$, where $r_i''$ is the slot with the smallest slot index among ($r_0, r_1, r_2, \ldots$) and ($r_0', r_1', r_2', \ldots$), and $T_3$ is equal to $T_{proc,1}^{SL}$, where $T_{proc,1}^{SL}$ is defined in slots in Table 8.1.4-2 where $\rho_{SL}$ is the SCS configuration of the SL BWP.

The following higher layer parameters affect this procedure:
  sl-SelectionWindowList: internal parameter $T_{2min}$ is set to the corresponding value from higher layer parameter sl-SelectionWindowList for the given value of $prio_{TX}$.
  sl-ThresPSSCH-RSRP-List this higher layer parameter provides an RSRP threshold for each combination ($p_i$, $p_j$), where $p_i$ is the value of the priority field in a received SCI format 1-A and $p_j$ is the priority of the transmission of the UE selecting resources; for a given invocation of this procedure, $p_j = prio_{TX}$.
  sl-RS-ForSensing selects if the UE uses the PSSCH-RSRP or PSCCH-RSRP measurement, as defined in clause 8.4.2.1.
  sl-ResourceReservePeriodList-r16
  sl-SensingWindow internal parameter $T_0$ is defined as the number of slots corresponding to sl-SensingWindow ms.
  sl-TxPercentageList internal parameter X for a given $prio_{TX}$ is defined as sl-TxPercentageList ($prio_{TX}$) converted from percentage to ratio
  sl-PreemptionEnable: if sl-PreemptionEnable-r16 is provided, and if it is not equal to 'enabled', internal parameter $prio_p$ re is set to the higher layer provided parameter sl-PreemptionEnable The resource reservation interval, $P_{rsvp\_TX}$, if provided, is converted from units of ms to units of logical slots, resulting in $P_{rsvp\_TX}'$ according to clause 8.1.7.

Notation:

($t_0^{SL}, t_1^{SL}, t_2^{SL}, \ldots$) denotes the set of slots which can belong to a sidelink resource pool and is defined in Clause 8.

The following steps are used:
  1) A candidate single-slot resource for transmission $R_{x,y}$ is defined as a set of $L_{subCH}$ contiguous sub-channels with sub-channel x+j in slot $t_y^{SL}$ where j=0, ..., $L_{subCH}$−1. The UE shall assume that any set of $L_{subCH}$ contiguous sub-channels included in the corresponding resource pool within the time interval [n+$T_1$, n+$T_2$] correspond to one candidate single-slot resource, where
    selection of $T_1$ is up to UE implementation under $0 \leq T_1 \leq T_{proc,1}^{SL}$, where $T_{proc,1}^{SL}$ is defined in slots in Table 8.1.4-2 where $\mu_{SL}$ is the SCS configuration of the SL BWP;
    if $T_{2min}$ is shorter than the remaining packet delay budget (in slots) then $T_2$ is up to UE implementation subject to $T_{2min} \leq T_2 \leq$ remaining packet budget (in slots); otherwise $T_2$ is set to the remaining packet delay budget (in slots).
  The total number of candidate single-slot resources is denoted by $M_{total}$.
  2) The sensing window is defined by the range of slots [n−$T_0$, n−$T_{proc,1}^{SL}$) where $T_0$ is defined above and $T_{proc,1}^{SL}$ is defined in slots in Table 8.1.4-1 where $\mu_{SL}$ is the SCS configuration of the SL BWP. The UE shall monitor slots which can belong to a sidelink resource pool within the sensing window except for those in which its own transmissions occur. The UE shall perform the behaviour in the following steps based on PSCCH decoded and RSRP measured in these slots.
  3) The internal parameter $Th(p_i, p_j)$ is set to the corresponding value of RSRP threshold indicated by the i-th field in sl-ThresPSSCH-RSRP-List-r16, where i=$p_i$+($p_1$−1)*8.
  4) The set $S_A$ is initialized to the set of all the candidate single-slot resources.
  5) The UE shall exclude any candidate single-slot resource $R_{x,y}$ from the set $S_A$ if it meets all the following conditions:
    the UE has not monitored slot $t_m^{SL}$ in Step 2.
    for any periodicity value allowed by the higher layer parameter sl-ResourceReservePeriodList-r76 and a hypothetical SCI format 1-A received in slot $t_m^{SL}$ with "Resource reservation period" field set to that periodicity value and indicating all subchannels of the resource pool in this slot, condition c in step 6 would be met.
  6) The UE shall exclude any candidate single-slot resource $R_{x,y}$ from the set $S_A$ if it meets all the following conditions:
    a) the UE receives an SCI format 1-A in slot $t_m^{SL}$, and "Resource reservation period" field, if present, and "Priority" field in the received SCI format 1-A indicate the values $P_{rsvp\_RX}$ and $prio_{RX}$, respectively according to Clause 16.4 in [6, TS 38.213];

b) the RSRP measurement performed, according to clause 8.4.2.1 for the received SCI format 1-A, is higher than Th($\text{prio}_{RX}$, $\text{prio}_{TX}$);

c) the SCI format received in slot $t_m^{SL}$ or the same SCI format which, if and only if the "Resource reservation period" field is present in the received SCI format 1-A, is assumed to be received in slot(s) $t_{m+q\times P'_{rsvp\_RX}}^{SL}$ determines according to clause 8.1.5 the set of resource blocks and slots which overlaps with $R_{x,y+j\times P'_{rsvp\_TX}}^{SL}$ for q=1, 2, ..., Q and j=0, 1, ..., $C_{reset}$− 1. Here, $P_{rsvp\_RX}'$ is $P_{rsvp\_RX}$ converted to units of logical slots according to clause 8.1.7

$$Q = \left\lceil \frac{T_{scal}}{P_{rsvp\_RX}} \right\rceil$$

if $P_{rsvp\_RX} T_{scal}$ and n'−m≤$P_{rsvp\_RX}'$, where $t_{n'}^{SL}$=n if slot n belongs to the set ($t_0^{SL}$, $t_1^{SL}$, ..., $t_{T_{max}}^{SL}$), otherwise slot $t_{n'}^{SL}$ is the first slot after slot n belonging to the set ($t_0^{SL}$, $t_1^{SL}$, ..., $t_{T_{max}}^{SL}$); otherwise Q=1. $T_{scal}$ is set to selection window size $T_2$ converted to units of ms.

7) If the number of candidate single-slot resources remaining in the set $S_A$ is smaller than X. $M_{total}$, then Th($p_i$, $p_j$) is increased by 3 dB for each priority value Th($p_i$, $p_j$) and the procedure continues with step 4.

The UE shall report set $S_A$ to higher layers.

If a resource $r_i$ from the set ($r_0$, $r_1$, $r_2$, ...) is not a member of $S_A$, then the UE shall report re-evaluation of the resource $r_i$ to higher layers.

If a resource $r_i'$ from the set ($r_0$, $r_1$, $r_2$, ...) is not a member of $S_A$ due to exclusion in step 6 above by comparison with the RSRP measurement for the received SCI format 1-A with an associated priority $\text{prio}_{RX}$, and satisfy one of the following conditions, then the UE shall report pre-emption of the resource $r_i'$ to higher layers.

sl-PreemptionEnable is provided and is equal to 'enabled' and $\text{prio}_{TX} > \text{prio}_{RX}$ sl-PreemptionEnable is provided and is not equal to 'enabled', and $\text{prio}_{RX} < \text{prio}_{pre}$ and $\text{prio}_{TX} > \text{prio}_{RX}$

TABLE 8.1.4-1

$T_{proc, 0}^{SL}$ depending on sub-carrier spacing

| $\mu_{SL}$ | $T_{proc, 0}^{SL}$ [slots] |
|---|---|
| 0 | 1 |
| 1 | 1 |
| 2 | 2 |
| 3 | 4 |

TABLE 8.1.4-2

$T_{proc, 1}^{SL}$ depending on sub-carrier spacing

| $\mu_{SL}$ | $T_{proc, 1}^{SL}$ [slots] |
|---|---|
| 0 | 3 |
| 1 | 5 |
| 2 | 9 |
| 3 | 17 |

Appendix C

| | |
|---|---|
| Original | 4) The set $S_A$ is initialized to the set of all the candidate |
| insertion | legacy |
| Original | single-slot resources |
| Insertion | in the resource selection window. |
| Original | 5) The UE shall exclude any candidate single-slot resource $R_{x,y}$ from the set $S_A$ if it meets all the following conditions: the UE has not monitored slot slot $t_m^{SL}$ in Step 2. for any periodicity value allowed by the higher layer parameter sl-ResourceReservePeriodList-r16 and a hypothetical SCI format 1-A received in slot $t_m^{SL}$ with "Resource reservation period" field set to that periodicity value and indicating all subchannels of the resource pool in this slot, condition c in step 6 would be met. 6) The UE shall exclude any candidate single-slot resource |
| Insertion | with LBT gap |
| Original | $R_{x,y}$ from the set $S_A$ if it meets all the following conditions: a) the UE receives an SCI format 1-A in slot $t_m^{SL}$, and "Resource reservation period" field, if present, and "Priority" field in the received SCI format 1-A indicate the values $P_{rsvp\_RX}$ and $\text{prio}_{RX}$, respectively according to Clause 16.4 in [6, TS 38.213]; b) the RSRP measurement performed, according to clause 8.4.2.1 for the received SCI format 1-A, is higher than Th($\text{prio}_{RX}$, $\text{prio}_{TX}$); c) the SCI format received in slot $t_m^{SL}$ or the same SCI format which, if and only if the "Resource reservation period" field is present in the received SCI format 1-A, is assumed to be received in slot(s) $t_{m+q\times P'_{rsvp\_RX}}^{SL}$ determines according to clause 8.1.5 the set of resource blocks and slots |
| Insertion | with LBT gap |
| Original | which overlaps with $R_{x,y+j\times P'_{rsvp\_TX}}$ for q = 1, 2, ..., Q and j = 0, 1, ..., $C_{resei}$ − 1. Here, $P_{rsvp\_RX}'$ is $P_{rsvp\_RX}$ converted to units of logical slots according to clause 8.1.7, $Q = \left\lceil \frac{T_{scal}}{P_{rsvp\_RX}} \right\rceil$ if $P_{rsvp\_RX} < T_{scal}$ and n' − m ≤ $P_{rsvp\_RX}$, where $t_n^{SL}$ = n if slot n belongs to the set ($t_0^{SL}$, $t_1^{SL}$, ..., $t_{T_{max}}^{SL}$), otherwise slot $t_{n'}^{SL}$ is the first slot after slot n belonging to the set ($t_0^{SL}$, $t_1^{SL}$, ..., $t_{T_{max}}^{SL}$); otherwise Q = 1. $T_{scal}$ is set to selection window size $T_2$ converted to units of ms. |
| Insertion | 7) The UE shall exclude any candidate single-slot resource $R_{x,y}$ from the set $S_A$ if the received SCI 1-A messages from other UEs indicating the LBT gap duration prior to the candidate single-slot resource is occupied. |
| Original | 8) If the number of candidate single-slot resources remaining in the set $S_A$ is smaller than X · $M_{total}$ then Th($p_i$, $p_j$) is increased by 3 dB for each priority value Th($p_i$, $p_j$) |
| insertion | and/or the LBT gap duration is reduced by a time duration of x symbols, |
| Original | and the procedure continues with step 4. The UE shall report set $S_A$ to higher layers. If a resource $r_i$ from the set ($r_0$, $r_1$, $r_2$, ...) is not a member of $S_A$, then the UE shall report re-evaluation of the resource $r_i$ to higher layers. |
| Insertion | The new condition for resource reselection due to the LBT is defined: If transmitting UE cannot obtain the channel access before the LBT gap expires, the UE triggers a resource reselection at the point of time when the LBT gap expires. |
| Original | If a resource $r_i'$ from the set ($r_0'$, $r_1'$, $r_2'$, ...) is not a member of $S_A$ due to exclusion in step 6 above by comparison with the RSRP measurement for the received SCI format 1-A with an associated priority $\text{prio}_{RX}$, and satisfy one of the following conditions, then the UE shall report pre-emption of the resource $r_i'$ to higher layers. sl-PreemptionEnable is provided and is equal to 'enabled' and $\text{prio}_{TX} > \text{prio}_{RX}$ sl-PreemptionEnable is provided and is not equal to 'enabled', and $\text{prio}_{RX} < \text{prio}_{pre}$ and $\text{prio}_{TX} > \text{prio}_{RX}$ |

The invention claimed is:

1. A device comprising:
a transceiver configured to access a communication network using a sidelink channel; and
a device controller configured to:
perform a listen-before-transmit (LBT) sensing operation; and
perform a transmission using the sidelink channel based on the LBT sensing operation with respect to a slot boundary, wherein the transmission occupies at least a portion of a first slot,
wherein the LBT sensing operation occupies at least a portion of an LBT gap, and at least a portion of the LBT gap occupies at least a portion of a second slot.

2. The device of claim 1, wherein the LBT gap occupies one or more symbols of the second slot.

3. The device of claim 1, wherein:
the second slot comprises a sidelink control channel portion; and
the device controller is configured to perform a decoding operation on at least a portion of the sidelink control channel portion.

4. The device of claim 3, wherein at least a portion of the decoding operation overlaps at least a portion of the LBT sensing operation.

5. The device of claim 1, wherein the second slot is adjacent to the first slot.

6. The device of claim 1, wherein the LBT gap occupies at least a portion of a third slot.

7. A device comprising:
a transceiver configured to access a communication network using a sidelink channel; and
a device controller configured to:
transmit, using the sidelink channel, an indication of a resource for a listen-before-transmit (LBT) sensing operation for the transmission;
perform, using the resource, the LBT sensing operation;
perform a transmission using the sidelink channel based on the LBT sensing operation with respect to a slot boundary, wherein the transmission occupies at least a portion of a first slot, and wherein the LBT sensing operation occupies at least a portion of a second slot; and
transmit, based on the LBT sensing operation, a reservation signal, wherein the reservation signal occupies at least a portion of the second slot.

8. The device of claim 7, wherein the reservation signal occupies a portion of the second slot between a completion of the LBT sensing operation and a guard period of the second slot.

9. The device of claim 8, wherein the completion of the LBT sensing operation is based on an expiration of a backoff time.

10. The device of claim 9, wherein the expiration of the backoff time is based on a backoff counter.

11. The device of claim 7, wherein the device controller is configured to perform a resource reselection operation based on the LBT sensing operation.

12. The device of claim 11, wherein the device controller is configured to perform the resource reselection operation based on at least a portion of the LBT sensing operation occupying at least a portion of the first slot.

13. A device comprising:
a transceiver configured to access a communication network using a sidelink channel; and
a device controller configured to:
select a resource for a listen-before-transmit (LBT) sensing operation for the transmission; and
select a resource for a transmission using the sidelink channel based on the LBT sensing operation with respect to a slot boundary.

14. The device of claim 13, wherein:
the resource for the transmission comprises a first frequency range; and
the resource for the LBT sensing operation comprises a second frequency range, wherein
the second frequency range overlaps, at least partially, the first frequency range.

15. The device of claim 13, wherein:
the transmission occupies at least a portion of a first slot; and
the LBT sensing operation occupies at least a portion of a second slot.

16. The device of claim 15, wherein the second slot is adjacent to the first slot.

17. The device of claim 13, wherein the device controller is configured to:
determine a selection window for the resource for the transmission;
select the resource for the transmission from the selection window; and
select the resource for the LBT sensing operation from the selection window.

18. The device of claim 13, wherein the resource for the LBT sensing operation is based on an LBT gap for the LBT sensing operation.

19. The device of claim 18, wherein the device controller is configured to determine the LBT gap based on sidelink control information (SCI).

20. The device of claim 13, wherein the device controller is configured to:
select the resource for the transmission using a processing operation; and
select the resource for the LBT sensing operation using the processing operation.

* * * * *